April 14, 1964  P. A. ZELISKO  3,128,548
METHOD AND MEANS FOR PROCESSING COILED STOCK INTO CONTAINERS
Filed Sept. 26, 1960  8 Sheets-Sheet 1

INVENTOR
PETER A. ZELISKO
BY Brown, Jackson
Boettcher & Drenner
ATTORNEYS

INVENTOR
PETER A. ZELISKO
BY Brown, Jackson,
Boettcher & Dienner
ATTORNEYS

April 14, 1964     P. A. ZELISKO     3,128,548
METHOD AND MEANS FOR PROCESSING COILED STOCK INTO CONTAINERS
Filed Sept. 26, 1960     8 Sheets-Sheet 3

INVENTOR
PETER A. ZELISKO

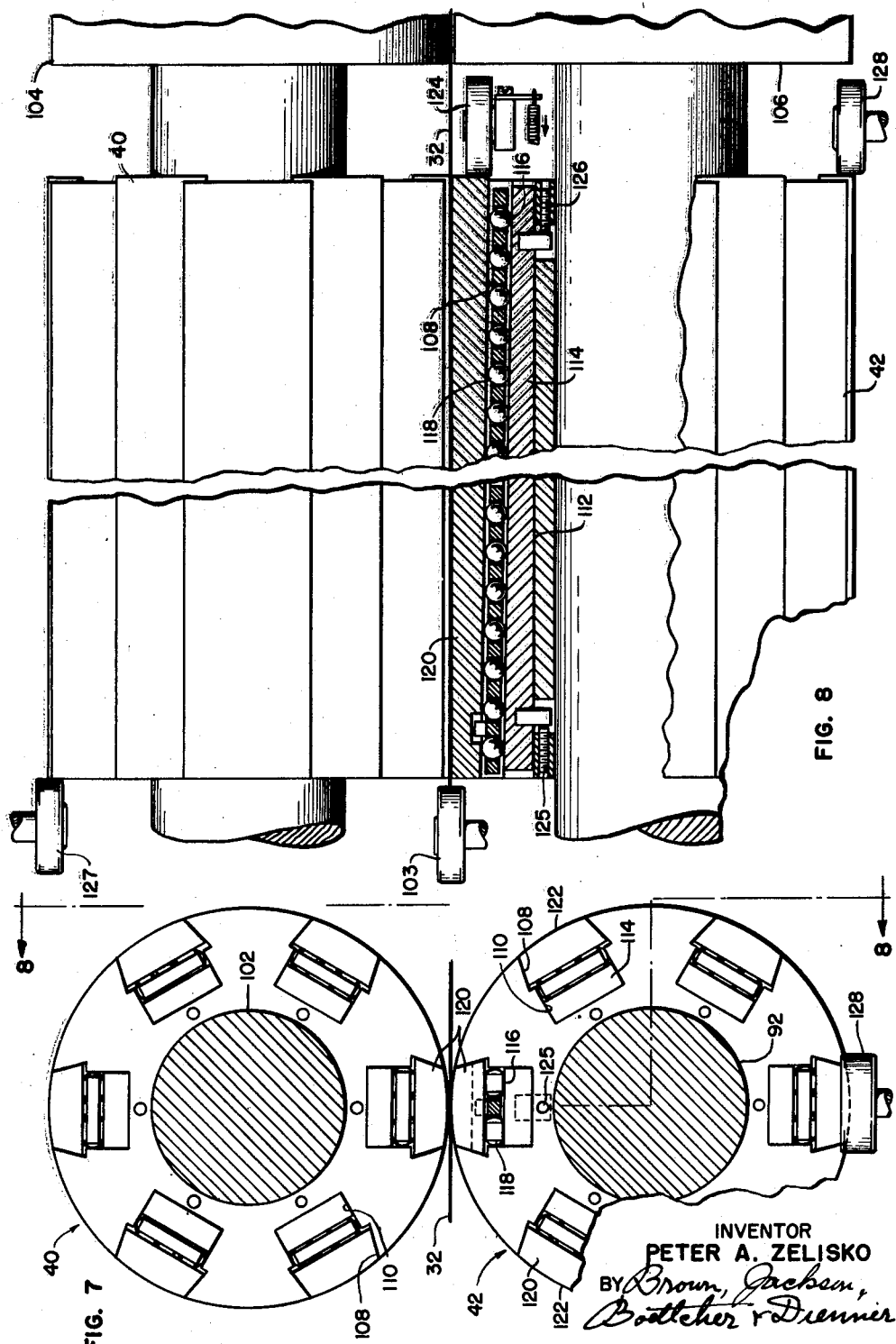

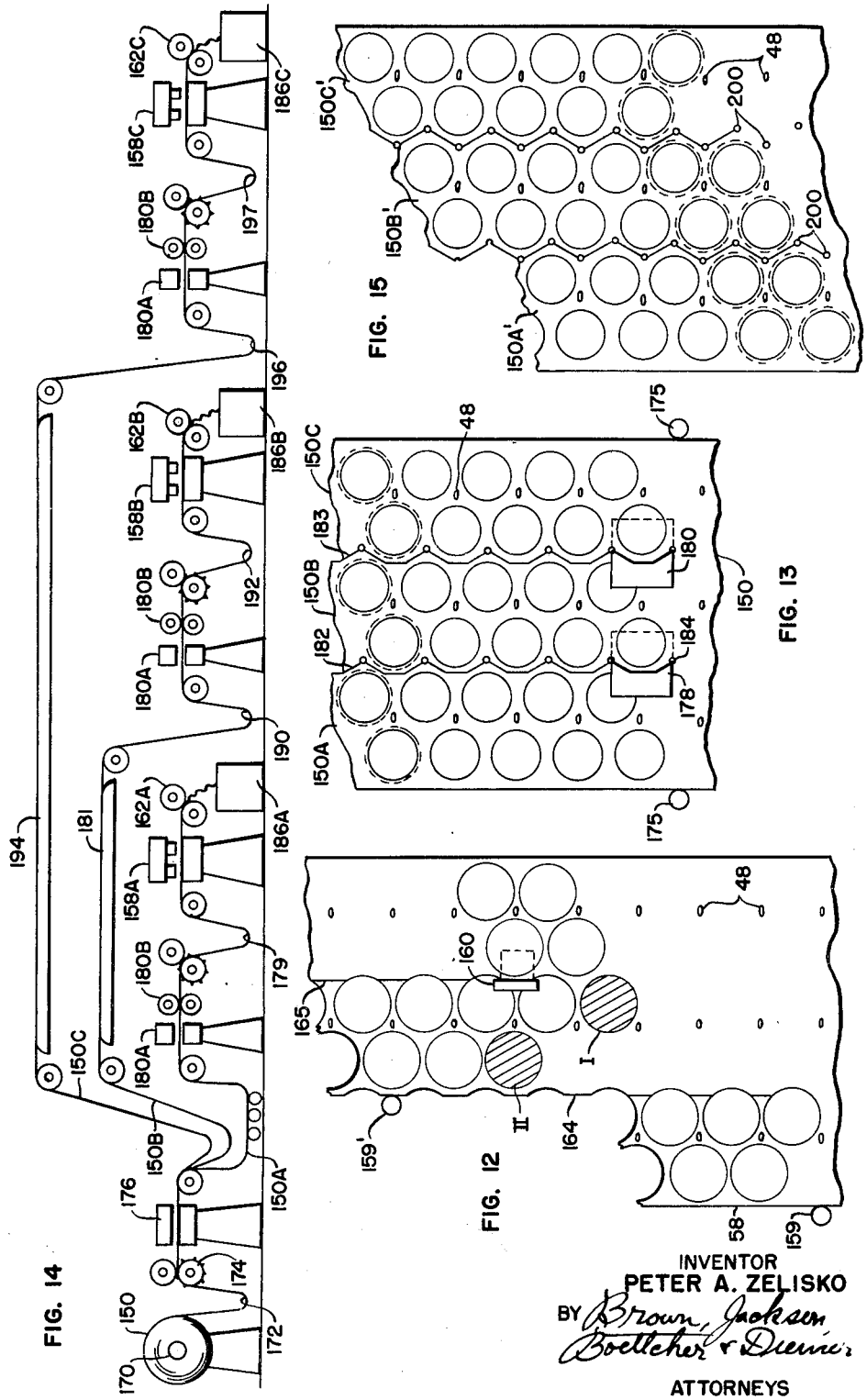

April 14, 1964 P. A. ZELISKO 3,128,548
METHOD AND MEANS FOR PROCESSING COILED STOCK INTO CONTAINERS
Filed Sept. 26, 1960 8 Sheets-Sheet 6
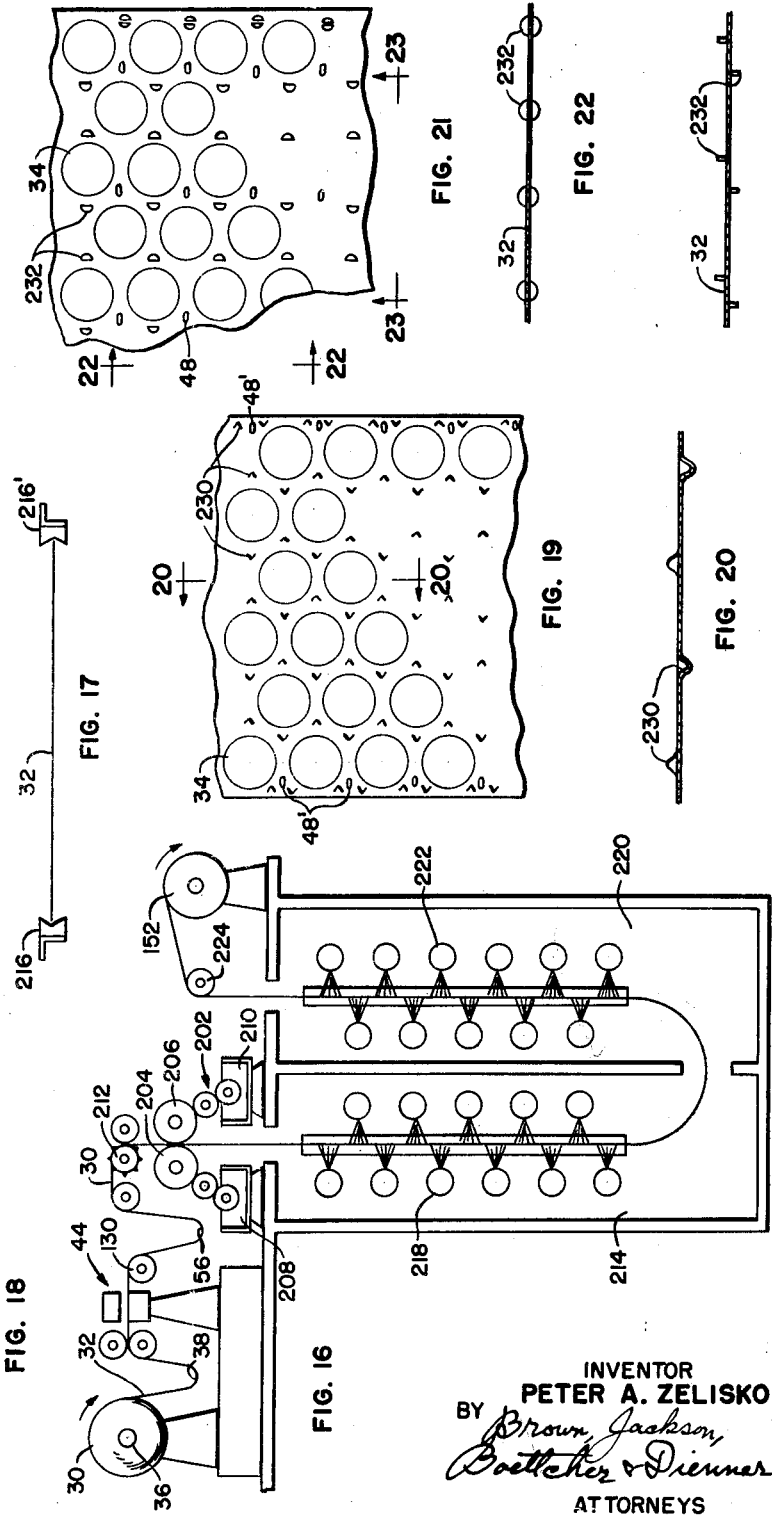
INVENTOR
PETER A. ZELISKO
BY Brown, Jackson,
Boettcher & Dienner
ATTORNEYS

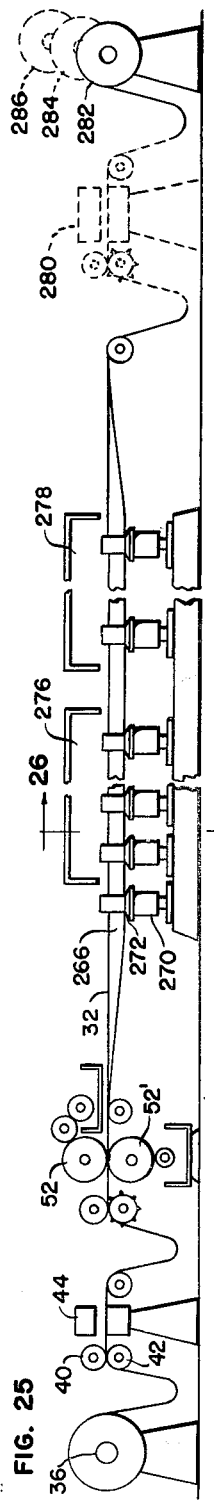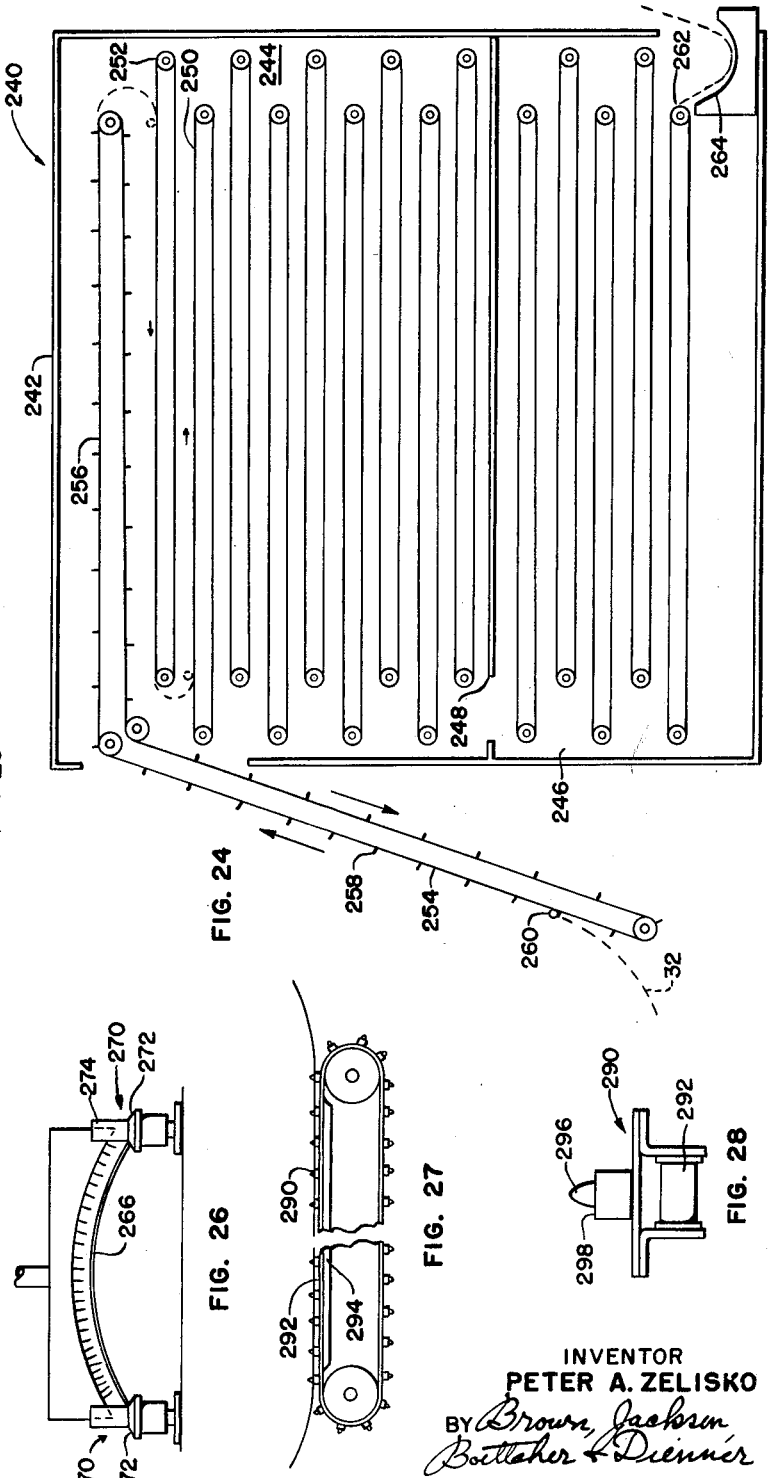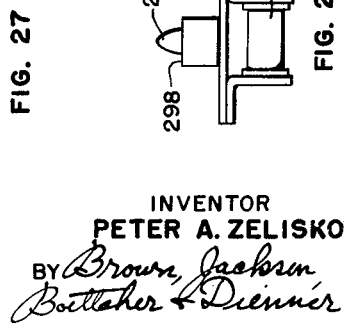

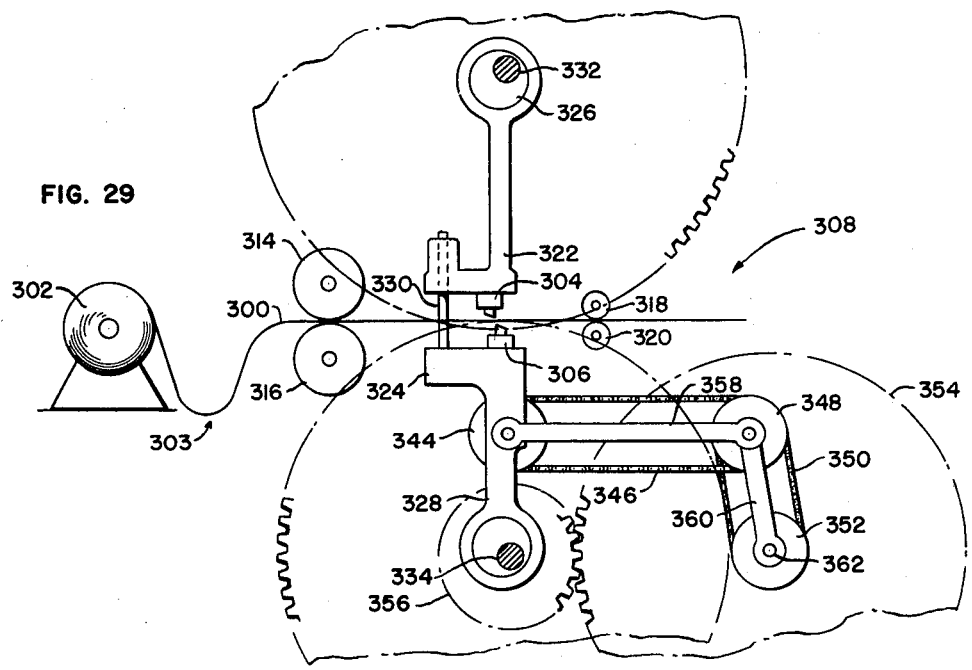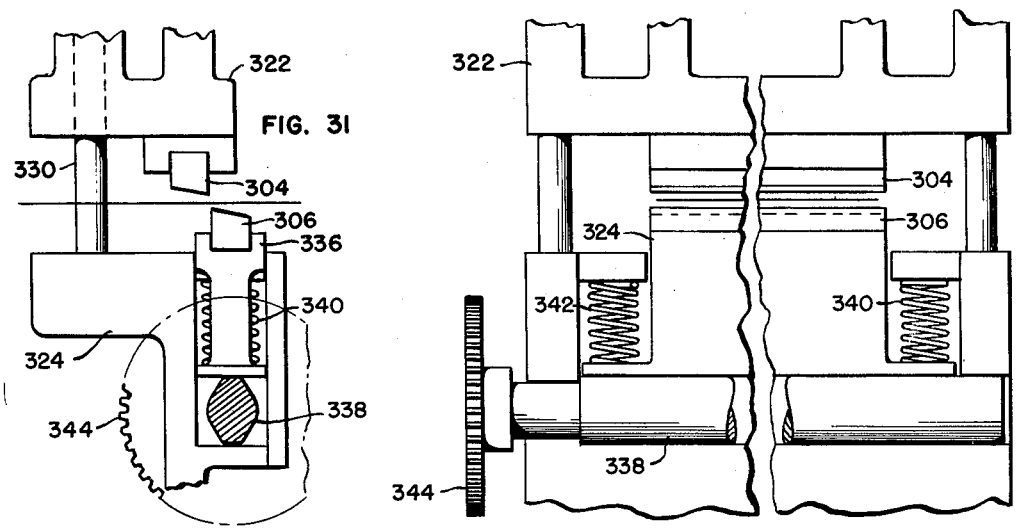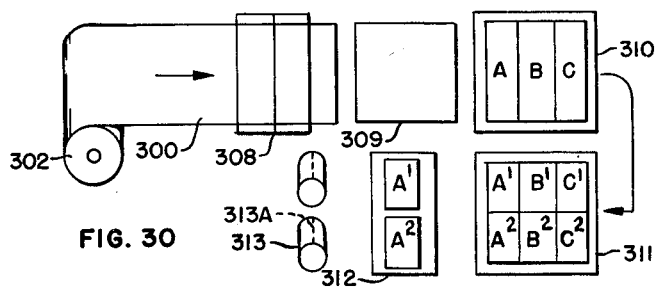

United States Patent Office 3,128,548
Patented Apr. 14, 1964

3,128,548
METHOD AND MEANS FOR PROCESSING COILED STOCK INTO CONTAINERS
Peter A. Zelisko, 5650 S. Whipple St., Chicago, Ill.
Filed Sept. 26, 1960, Ser. No. 58,280
26 Claims. (Cl. 29—529)

This invention relates to the manufacture of various articles such as containers including the ends and wall thereof from lengths of flat sheet stock. More particularly it relates to novel and improved means and method of manufacturing said articles from coiled metal sheet stock. For example, although not limited thereto, the invention has particular utility in forming circular-shaped can-ends from long lengths of tinplate which have been coiled into roll form for convenience in storage and/or handling.

A principal object of the invention is to provide novel and improved methods of treating and handling such coiled stock whereby the ends and/or sidewalls for tin cans or other containers may be formed therefrom in a highly efficient, practical and economical manner.

Tinplate, when used in the manufacture of can-ends, is customarily coated with an appropriate lacquer or enamel on one or both sides depending on the contents and/or environment of the cans. For numerous reasons, it has been found more feasible to apply said coatings to the tinplate before it has been delivered to the press for stamping out the can-ends. However, in the interest of practicing economy in the use of the lacquering material, as well as a need to keep the dies of the stamping press clean and out of contact with the coated areas as much as is possible, it is desired that the lacquer or other coating material be applied only to the areas of the potential can-end blanks which will be exposed in the finished can. Consequently, not only has it been found desirable to omit the coating material from the waste areas of the sheet stock but also to omit it from the outer margins of the can-end blanks which are curled or are otherwise reformed in the can construction.

This restrictive application of the coating introduces problems of registration. First, it makes it necessary to be able to accurately locate the coated areas in concentric relation with each other as when a coating is applied to opposite sides of the strip material, or when more than one coat is to be applied to the same side. Secondly, and equally importantly, there is the problem of being able to properly register or center the coated areas with respect to the potential blanks which are to be subsequently punched out of the sheet stock and fabricated into container ends.

These problems of registration are further complicated by the fact that previously coiled tinplate and other sheet metals, in the thicknesses used most frequently, readily warp as a roll thereof is unwound causing the side edges thereof to lose their straight line parallel definition and to take on an ogee or reversely curved configuration in plan view. This warping of the tinplate as it is uncoiled and readied for the coating or stamping presses makes it exceedingly difficult to feed the strip through a machine with its edges following a straight path. This adds considerably to the already difficult problem of so locating the ribbon of sheet metal in each of the succeeding coating, shearing and blanking stations that the can-ends as finally punched from the sheet metal will have the spot coatings properly centered thereon.

The problem is also present when attempting to shear the uncoiled stock into suitably sized rectangular pieces as in the fabrication of the sidewalls of the cans which are subsequently rolled into a cylindrical form and assembled with said circular ends.

Therefore, a principal object of the present invention is to provide novel means and method of feeding the uncoiling sheet stock into a shearing, perforating or other device and which feed means and method will compensate for the cambered side edges of the warped stock so that the stock will be properly registered for said shearing, perforating or the like.

Thus in a process of manufacturing can-ends, for example, applicant's invention contemplates first punching in a linear series of spaced perforations or their equivalent in the unwinding sheet stock under the control of feed means which permit limited sidewise floating of the sheet without losing control of its forward advance. The regular spacing of the perforations thus produced may be then relied upon to properly index advancing of the ribbon through the succeeding operations to obtain longitudinal registration thereof while permitting the sheet stock to float sideways, as it is thus advanced, will allow one edge of the sheet metal to be held against a reference stop to compensate for the mentioned camber or ogee shape of its side edges.

A further feature of the invention is that the sheet stock is unwound from its coil into a slack loop so that feed of the ribbon into the press is from the slack loop and not the tensioned coil of stock which might affect the sidewise float of the ribbon stock as it is fed into the perforating press.

Thus an important object of the invention is to provide novel feed means for the uncoiling ribbon stock which will permit sidewise floating of the stock against a reference gauge while keeping full control at all times of the rate of its longitudinal feed.

In subsequent spot coating, shearing and punching out of the can-ends from the coated areas, the index perforations or punchings are engaged by the teeth of drive sprockets which locate the potential blanks with respect to the coating rollers, and dies of shearing presses or punches, etc. Since these drive sprockets are ordinarily fixed on their axles against any lateral displacement, the invention further contemplates that the index punchings formed in the sheet metal will be slightly elongated and have their longer dimension which extends transversely of the direction of feed of the strip sufficiently wider than the teeth of the sprocket which engage therein to accommodate sidewise floating of the cambered stock. Consequently as the strip rides the drive sprockets to assure longitudinal registration of the strip between the coating rollers and dies of the succeeding presses, it will be permitted sidewise floating movement with reference to said teeth to keep its gauging edge against a pre-located reference stop or guide in the coating or press stations wherefor proper registration of the coating upon the can-ends as they subsequently are punched from the sheet stock is assured. This controlled feed of the ribbon stock further reflects in a smoothly operating and essentially trouble-free production line.

Thus, an important object of the invention is to provide means and method of first spot coating potential can-end forming areas or blanks of sheet stock and then to punch out the can-ends from said areas with perfect register between the spots and the punched can-ends.

Another important object of the invention is to adapt such a process to one utilizing sheet stock that has been previously tightly wound into coils or rolls.

Still another object of the invention is to provide means and method for obtaining proper registration of cambered sheet stock in the punch presses and spot coating devices through which the stock is fed in its processing to coated can-ends or the like.

A further feature of the invention is the novel arrangement which it provides for the subsequent curing of the spot coated sheet stock whereby the application of the coating material to one or both sides of the sheet stock may be carried out effectively and efficiently as a continuous operation.

The compositions of the coatings to be applied can vary considerably and will be determined by the nature of the material which is to be stored in the cans and/or the conditions and environment for which the cans are intended. In many instances only one coating is required and this is placed on the inside of the can-end, the outside of the can-end being left bare or uncoated. In other instances more than one coating may be required. For example, it may be necessary to apply a primer coat before the final protective layer is applied. In other instances, as with cans which are to contain beer, it is desirable to apply coatings of lacquer to both the inside and the outside of the can-ends.

Previous attempts to coat the tinplate or other sheet metal on both sides have usually consisted in cutting the stock into rectangles which were of a size that could be easily handled. These could be coated on one side by passing the individual sheets through the coating machine and then through the baking oven, after which they were allowed to cool. After one side had been thus processed, the sheets could be reversed and the steps repeated to coat their opposite side. Such a process was necessarily slow and also cumbersome because the coating applied to the first side could not be allowed to contact any supporting object until and unless it had been baked perfectly dry. Furthermore, many of the coating materials used are thermoplastic in nature and tend to become tacky when reheated. Consequently, when the second side of the sheet was being processed in the curing oven, the coating previously applied to its opposite side would soften and stick to the supporting surface.

These problems and difficulties are increased and become more vexatious when coiled stock is substituted for the smaller lengths of cut-to-size sheets referred to above.

Thus, a further object of the invention was to devise new and novel means and methods of coating and curing the applied spot coatings which would be particularly adapted for use in treating coiled stock in a continuous operation.

Another object was to provide novel means and method by which the sheet stock could be simultaneously coated on both sides and/or could be continuously passed from the coating station into a baking or drying stage and then a cooling stage area without interruption of the process and without the wet or incompletely cured coating coming into contact with any support as it is moved through the heating and cooling areas of the curing station.

In accomplishing these objects, the invention, in one of its forms, contemplates that the sheet stock as it leaves the coating station will travel a path in the form of a great loop, first, passing downwardly through a heated vertical tunnel then turning and proceeding upwardly through a cooling area to the next step in the process. As the strip proceeds through the tunnel, guide rails loosely restrain the moving loop by edge contact but do not contact the wet spots of coating which are spaced from said edges.

The invention, in another form, contemplates that the sheet stock as it exits from the coating station will remain in a horizontal path but arched between confining edge engaging rollers. In this arrangement also, the coating spots will have no contact with the rollers or other surfaces until they have completely dried.

In still another form, the invention contemplates a plurality of parallel disposed horizontally traveling continuous chains provided with supporting lugs so spaced and arranged as to engage within the index perforations previously punched in the sheet stock. These lugs have shoulders on which the sheet stock ride but which shoulders are dimensioned as not to engage or contact the previously applied coat areas on either side of the sheet stock.

In yet another form, the invention contemplates that the sheet stock as it is uncoiled and passed through the indexing press may be modified by impressing tines or dimples in waste areas thereof about the blanks to be coated so that the coated stock may thereafter be supported by horizontally moving belt or other plane surface for passing through the heating and cooling stages of the curing station without either side being contacted thereby to disturb the coating as it cures. These tines or dimples may be subsequently removed as by puching out the same from the sheet so as to leave a flat sheet which may be completely recoiled for future use.

The invention also contemplates that such further punchings may be so located as to be thereafter useful as clearance openings which will aid in the shearing of the wide ribbon into narrower ones for convenience in punching out the can-ends or spot coated blanks.

Although for economics of operation, particularly in the coating and curing stages, it is desirable to use as wide sheet stock as is practicable and wherefore the ribbon will usually have a width embracing several rows of cans, presses having enough dies to effectively consume the full width of such ribbons are not readily available. Also, they are complicated, relatively slow operating and are not readily convertible from one size can-end to another.

It is therefore a further object of the invention to devise means and method of forming can-ends and the like in which relatively wide sheet stock is initially indexed and coated on one or both sides of each blank and then is adapted for separating of the coated blanks through the use of either simultaneously or successively operating presses having a width less than the total width of the stock as it comes from the coating station.

In one form of the invention, the wide sheet stock may be fed through a series of presses each of which cuts out can-ends in one, two or more rows, and trims the waste material from the remainder of the sheet. Each press as it trims the waste material forms a new gauging edge for the succeeding press which then stamps out one, two or more rows in the now narrower sheet stock. The number of presses needed will depend on the number of rows of blanks the sheet is wide as well as the number of rows the individual presses are able to act upon.

In an alternate form of the invention, the wide ribbon, after it has been spot coated, is first scrolled sheared lengthwise into a number of narrow ribbons and each narrow ribbon is fed through a separate punch press, all working simultaneously.

It is a feature of the invention that in neither of the shearing steps is it essential that the punching presses operate "in phase" or make exactly the same number of strokes in a given period of time. This is permitted because the invention contemplates a slack-loop of the material of the sheet stock between each press which will provide the flexibility needed to permit one press to start or stop one flywheel turn ahead of or behind another.

The aforementioned use of slack loop is also used to advantage in accordance with the invention in many other steps of the process. For example, the presence of a slack loop between the coating and curing stations can be used to accommodate a difference in rate between the coating and curing operations or between the indexing and coating steps. Feeding from a slack loop into the coating, shearing or punching stations also relieves pull on the sheet stock which must be free to float sidewise as well as move lengthwise under the indexing of the feed sprockets to assure necessary registration.

Many other objects as well as advantages and/or features of the invention will be apparent, or will become so, from the more specific description of several forms of the invention which will now be described in connection with the accompanying drawings.

Now referring to the several sheets of the drawing which illustrates the invention:

FIGURE 7 is a sectional view taken along lines 7—7 of FIGURE 6 to illustrate details of construction of the feed rollers;

FIGURE 8 is a partially sectioned vertical view of the feed rollers taken lengthwise therethrough to further illustrate details of their construction;

Figure 1:
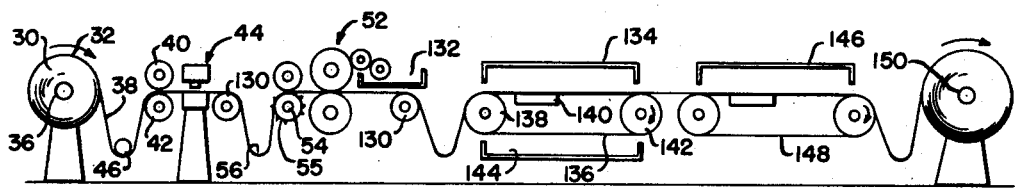
FIGURE 1 illustrates in schematic form a line of apparatus adapted in accordance with the invention to index and spot coat coiled sheet metal in readiness for the subsequent operations involved in punching out coated can-ends therefrom.
Figure 9:
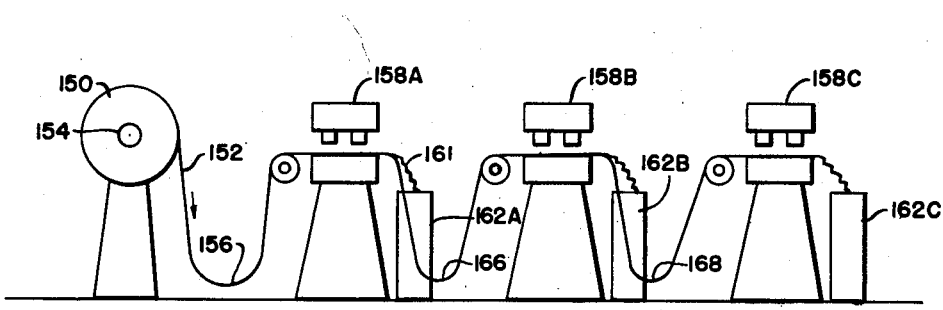
Figure 10:
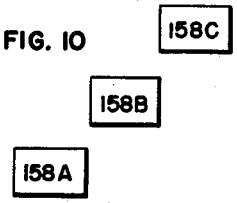
Figure 11:
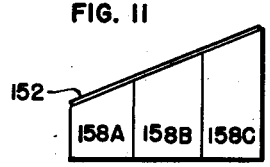

FIGURE 9 illustrated in schematic form a second line of apparatus and which are utilized to process into can-ends the indexed and spot coated sheet metal stock which is obtained from FIGURE 1;

FIGURE 10 is a plan view of the line of apparatus illustrated in FIGURE 9;

FIGURE 11 is a view taken transversely of said line of apparatus to show the inclined relation of the beds of the several presses;

FIGURE 12 illustrates the processing of the previously obtained index and spot coated sheet stock into can-end blanks by the apparatus of FIGURE 9;

FIGURE 13 illustrates an alternate method of processing the indexed and spot coated sheet metal into can-ends which involves first shearing the stock into narrower ribbons and then punching out can-ends from the narrower ribbons;

FIGURE 14 illustrates in schematic form a line of apparatus suitable for carrying out this alternate process;

FIGURE 15 illustrates another method by which indexed and spot coated sheet metal may be processed into can-ends in accordance with the invention and using a line of apparatus such as illustrated by FIGURE 14;

FIGURE 16 illustrates a modification of the line of apparatus of FIGURE 1 whereby the sheet metal may be simultaneously spot coated on both its sides;

FIGURE 17 is a sectional view taken transversely of the curing tunnel to illustrate one means of guiding the spot coated sheet metal therethrough;

FIGURE 18 illustrates in schematic form a further modification of the line of apparatus illustrated by FIGURE 1;

FIGURE 19 illustrates a section of sheet metal adapted for use in the process illustrated by FIGURE 18;

FIGURE 20 is a sectional view taken through the sheet illustrated in FIGURE 19;

FIGURE 21 illustrates a second or alternate adaptation of the sheet metal for use in the process of FIGURE 18;

FIGURE 22 is a sectional view taken along lines 22—22 of FIGURE 21 looking in the direction indicated by the arrows;

FIGURE 23 is a sectional view taken along lines 23—23 of FIGURE 21 looking in the direction indicated by the arrows;

FIGURE 24 illustrates in diagrammatic form an alternate construction for a curing oven;

FIGURE 25 illustrates still another modification of the line of apparatus of FIGURE 1 and which employs a different arrangement for supporting the spot coated sheet metal through the heating and cooling chambers;

FIGURE 26 is a sectional view of the heating chamber illustrated in the line of apparatus of FIGURE 25, said view being taken along lines 25—25 and looking in the direction indicated by the arrows;

FIGURE 27 illustrates still another means of moving the coated sheet stock through the heating and cooling chambers; and FIGURE 28 is an enlarged fragmented view of the supporting lugs utilized by the means of FIGURE 27.

FIGURE 29 illustrates schematically an alternate form of the invention adapted to cut coiled sheet stock into rectangular pieces for fashioning into sidewalls in the fabrication of tin cans;

FIGURE 30 illustrates schematically the steps followed in forming the coiled sheet stock into can sidewalls;

FIGURE 31 is an enlarged sectional view of the shear blades of the device illustrated by FIGURE 29; and FIGURE 32 is a fragmented sectional view of the same device taken at right angles to FIGURE 31.

Referring first to FIGURE 1, 30 represents a reel of tightly wound sheet metal 32 such as tinplate, from which circular blanks such as can-ends or other discs are to be punched after one or both sides thereof have been coated with an appropriate lacquer, enamel or other coating material and satisfactorily cured.

Figure 2:
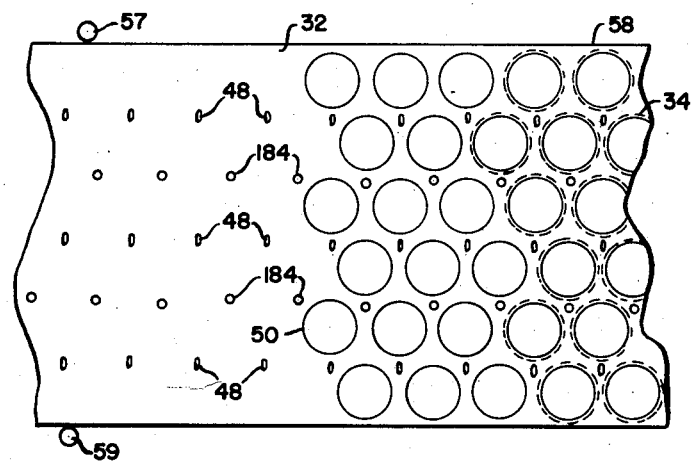
FIGURE 2 illustrates a sheet of tin plate or other sheet metal provided with index and clearance perforations and spot coatings of lacquer or enamel as applied to the sheet stock by means of the apparatus of FIGURE 1 and indicating the relation they assume to the can-ends as subsequently blanked from the sheet metal.

FIGURE 2 illustrates a section of ribbon 32 divided into several rows of potential can-end forming blanks indicated by phantom lines 34. Although other layouts could be utilized it is preferred that the blanks 34 be laid out as illustrated, that is, in rows essentially paralleling the side edges of the sheet stock, and with alternate rows staggered so as to provide a closely nested arrangement of blanks with a minimum of waste areas therebetween. It will be understood that the number of rows of can-end blanks is not critical to the invention but will be determined first by the size of the blanks to be stamped from the sheet stock and secondly the width of sheet stock that is available. In actual practice the width of the ribbon of sheet stock 32 may be such as to accommodate many more rows of blanks than the illustrated six rows.

Reel 30 of tinplate is mounted on a spindle 36 which is preferably power-driven so that a ribbon 32 of sheet metal is continuously paying off coil 30 into a slack loop indicated at 38 from which it is fed by rollers 40 and 42 between the dies of a punch press indicated generally at 44.

Appropriate means such as rider 46 may be provided to control the rate at which the ribbon of sheet metal is payed off coil 30. Thus rider 46 may be arranged to ride the bottom of the loop and to actuate a suitable switch (not shown) for the motor driven spindle 36. As the loop lengthens the rider will, of course, move downward, which action of the rider 46 will serve to disengage the switch so as to slow the r.p.m. of spindle 36 causing the loop to shorten. As the loop shortens, rider 46 will again move upward to reactuate the switch and so increase the r.p.m. of the spindle.

The function of press 44 is to punch index perforations 48 (FIGURE 2) at regular intervals in the waste areas of ribbon 32 between the nested can-end forming blanks 34. These perforations are relied upon to obtain proper registration or centering of the lacquer spots 50 on the potential can-end forming blanks 34 as they are applied to the sheet stock by apparatus 52. They are also utilized in the presses which subsequently punch the coated blanks out of the sheet metal ribbon to assure that the punching dies properly register with the coated areas 50.

It should be noted at this point that considerable advantages are to be gained by spot coating the ribbon only in those areas which are to be subsequently blanked out into can-ends. By omitting lacquer from the remaining waste areas of the sheet metal ribbon, it has been calculated that the resultant savings in the amount of coating material will be in the order of thirty percent. Where spot coating technique is used, it is, however, important to be able to precisely locate the spots of coating on the areas which are later punched from the ribbon and produce the finished can-ends.

Figure 3:
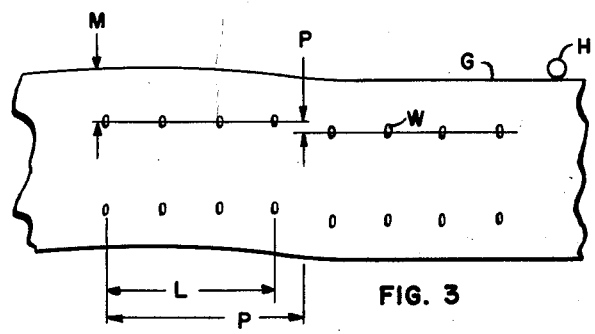
FIGURE 3 illustrates in somewhat exaggerated form the camber which is effected in sheet metal as it is unwound from a coiled roll thereof.

By locating index perforations 48 in the waste areas between each pair of rows of blanks 34 and spacing them at regular intervals, preferably at a distance equal to the diameter of the blanks 34, a toothed sprocket such as illustrated at 54 may be utilized to advance the ribbon from its slack loop 56 into the coating station 52 so as to obtain longitudinal registration therein of the potential can-end forming blanks 34 with the formations on the coating roller. However, there is also the problem of properly relating perforations 48 to the outside edge 58 of ribbon 32. Although the side edges 58 of the tinplate originally may have assumed essentially straight lines approximately parallel with each other, the thin tin-plate as it is uncoiled from roll 30, contains so much camber that it will take a warped form as shown in FIGURE 3.

Since press 44 will preferably be a flying sheer adapted to punch out several rows of perforations at a time, each row comprising several performations in length, some means for compensating for the ogee shape of the side edges 58 of the ribbon stock which said camber produces, will be needed.

Turning therefore to FIGURES 4 through 8, a flying shear type of punch press and construction of feed rolls is there shown which are so constructed and related as to accommodate the cambered sheet stock to permit its proper registration in the subsequent coating, shearing and can-end punching operations.

Figure 4:
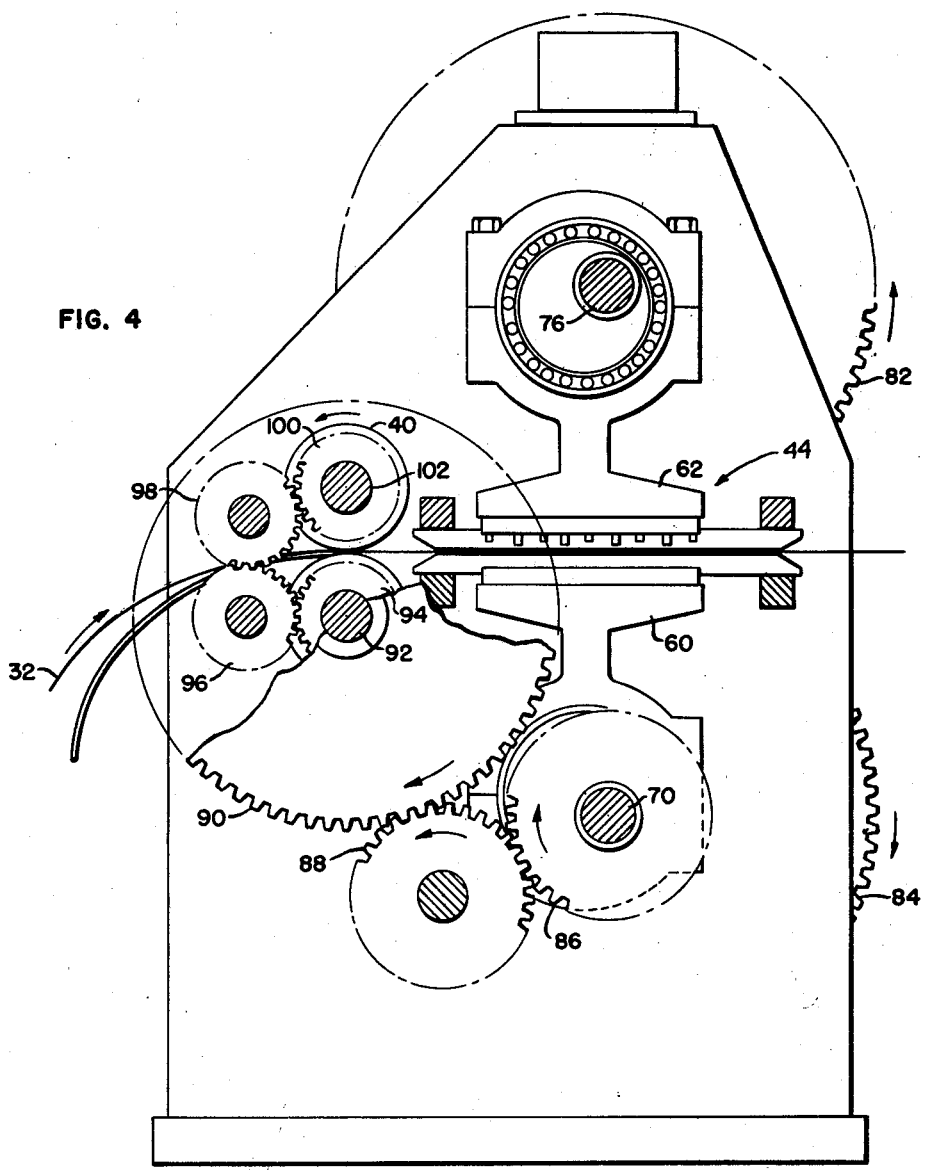
FIGURE 4 is a view in side elevation of a flying shear type press used to produce the index perforations in the sheet metal stock.
Figure 5:
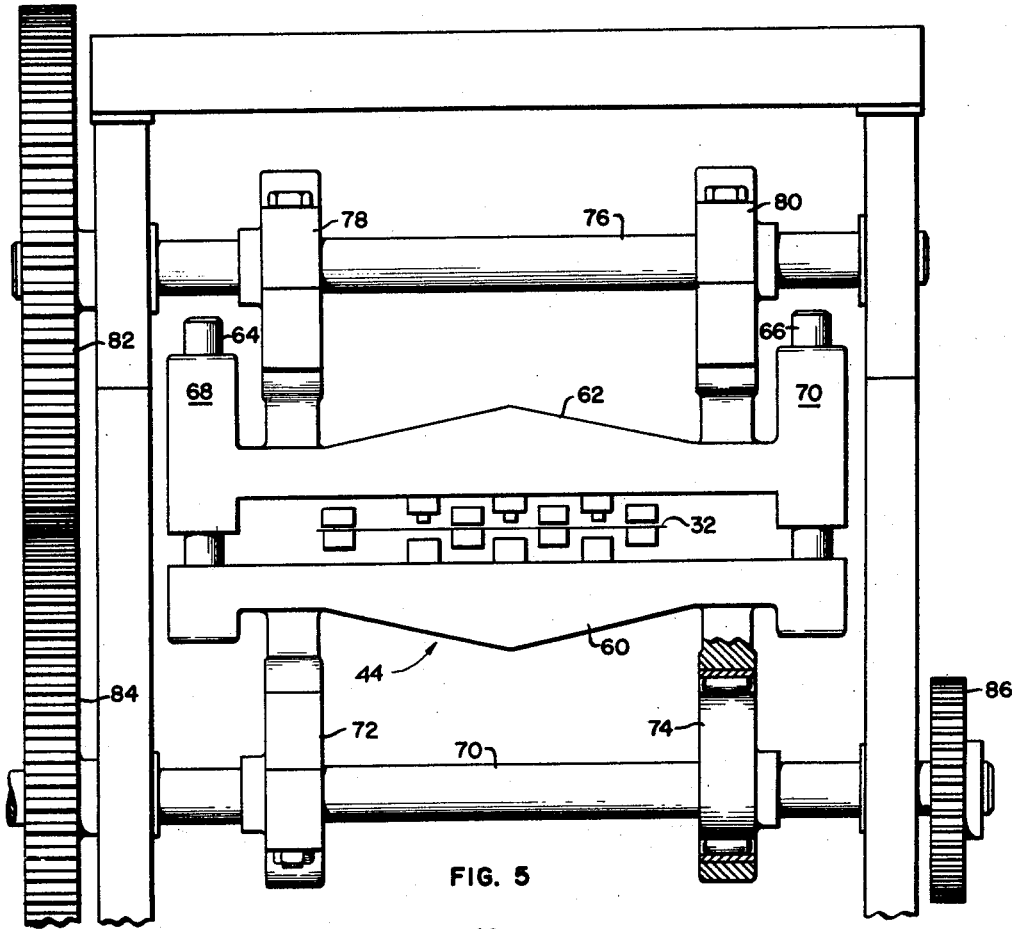
FIGURE 5 is a partially sectioned elevational view of the press taken at right angles to the position thereof illustrated by FIGURE 4.

Referring first to FIGURES 4 and 5, punch press 44 is shown to comprise a lower platen 60 and an upper platen 62 which move vertically with respect to each other under the guidance of leader pins 64 and 66. Pins 64 and 66 are respectfully mounted on the opposed sides of platen 60, while platen 62 has similarly located portions 68 and 70 to slidingly receive said pins 64 and 66 and which by reason of their close sliding fit with pins 64 and 66 keep the platens constantly aligned and their faces parallel to each other. The two platens 60 and 62 are supported by crank shafts geared to rotate in opposite directions but at equal angular velocity. Thus, platen 60 is carried by crank shaft 70 and eccentric sheaves 72 and 74 while the upper platen 62 is carried by a crank shaft 76 and eccentric sheaves 78 and 80. The two crank shafts are geared together by spur gears 82 and 84 which keep the crank shafts always in proper phase relation to each other. Platen 60 and 62 are provided with suitable perforating dies on their adjacent faces and which, in rotation of the crank shafts, follow a circular path having a radius governed by the eccentricity of the sheaves, 72, 74, 78, 80 and crank shafts 70 and 76. The system is so adjusted that both crank shafts are on inside dead center at the same instance and at which instance the two platens are moving together along the feed line of the sheet metal ribbon 32 therebetween.

Feed rollers 40, 42 are located on the entrant side of press 44 and act in conjunction to propel ribbon 32 through the press. One roller 40 is spring loaded against the other to grip the strip and both are given through suitable gearing 86 which transmits motion through idler 88 to drive gear 90 mounted on shaft 92 of roller 42. Roller shaft 92 supports a second gear 94 which in turn drives idlers 96 and 98 which drive gears 100 mounted on the shaft 102 of roller 40. Punch press 44 is essentially a constant velocity device and through the aforesaid gearing, feed rollers 40, 42 are adapted to propel ribbon 32 through the press at a constant speed and so that the punches carried by platens 60, 62 move with the ribbon at the same velocity during the time they are in contact with the ribbon. Thus, in FIGURE 4 the circumference of the crank circle 92 is equal to one-half the circumference of the feed rolls 40, 42 which means that the feed rolls make one turn for every two turns of the crank shaft.

For purposes of illustration, platen 62 is provided with four equally spaced punches and the ribbon 32 advances four space intervals for each turn of the crank shaft so that the space interval between the last perforation of one group of perforations and the first perforation of the adjacent group will be the same as the intergroup spacing.

Figure 6:
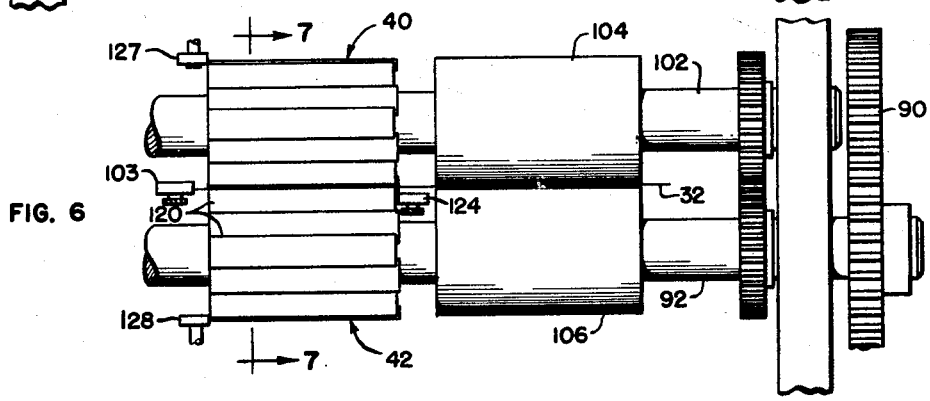
FIGURE 6 is a fragmented plan view of the feed rollers by which the sheet metal is fed into the press illustrated by FIGURES 4 and 5.

Ordinary feed rolls tend to feed a strip of material in a straight line regardless of the amount of camber present in its side edges. However, in accordance with the present invention, it is important that the ribbon 32 be free to move at right angles to the direction of its feed so that one edge of the ribbon may be maintained in contact with engaging roll 103 (FIGURE 6). At the same time the feed rolls must never lose control of the longitudinal movement or forward feeding of the ribbon through the press 44. FIGURES 6, 7, and 8 illustrate details in the construction of feed rollers 40, 42 by which this is obtained.

Both rollers are essentially alike except that roller 40 is spring loaded against roller 42 in order to obtain the necessary punching of the feed stock therebetween. It is not essential that the rollers comprise the entire width of the ribbon stock 32. For example, auxiliary rollers 104, 106 may be mounted on shafts 92 and 102 to one side of rollers 40 and 42 so as to turn therewith. However, auxiliary rollers 104, 106 do not pinch the ribbon stock but merely act to hold the portions of the ribbon which extend beyond feed rollers 40, 42 so that the entire width of the ribbon will be held in a more or less horizontal plane as it is fed by rollers 40, 42 between the perforating dies of the press.

As seen best in FIGURES 7 and 8, rollers 40, 42 each comprise a solid core keyed to its supporting shaft and having their periphery provided with a plurality of equidistantly spaced axially-extending parallel inverted V-shaped grooves 108 with which similarly related narrower rectangular grooves 110 communicate. The base of groove 110 is inclined with respect to the shaft center indicated at 112 in FIGURE 8 and supports a wedge 114 which in turn forms a track 116 for roller bearings 118. Roller bearings 118 in turn support a cross-feed wedge 120 having a close, but free sliding fit within groove 108. The outer exposed surface 122 of wedges 120 are curved so as to have the same radius as the core constituting the rollers 40, 42. Any excessive clearance between the several elements of the assembly, can be taken up by moving wedge 114 along the inclined plane 112 constituting the bottom wall of the rectangular groove 110. Adjusting screws 125 and 126 are provided between the roller bearings 118.

Through the aforesaid construction of rollers 40, 42 it will be apparent that as ribbon 32 is pinched between the solid core portions of the rollers the ribbon will move forwardly while it will be free to move sidewise with wedges 120 in a direction at right angles to the direction of longitudinal feed of the rollers in those intervals where it is pinched within the arc embraced by the arcuate outer surface of wedges 120. A spring loaded roller 124 constantly rides the ends of the wedges 120 as the rollers are turned, forcing each of the wedges with the portion of the ribbon pinched therebetween against a roller 103 fixed on the opposite side of the roller 124 for gauging the edge of the ribbon 32 as it enters press 44. Other fixed rollers 127 and 128 are provided diametrically opposite rollers 103 and 124 to recenter wedges 120 to their normal centered position on each turn of the feed rollers 40, 42.

In FIGURES 7 and 8, feed rollers 40, 42 have been illustrated as provided with six wedges 120 equidistantly spaced about their periphery which means that, for each complete revolution or turn of the rollers, the ribbon 32 may be moved sidewise six times. If the circumference of the feed rollers 40, 42 is approximately 26 inches, this means that a sidewise adjustment of the ribbon 32 can be made in every four and one-third inches of feed. Usually, the amount of camber per foot is small in the ribbon stock so that only a few thousands of an inch sidewise adjustment is needed for each correction interval.

Referring again to FIGURE 3, press 44 is to be considered as adapted to perforate the sheet stock in parallel rows of four perforations each. If the edge of the strip is cambered and perforations are to be located at a fixed distance M from the gauging edge G, the succeeding groups of perforations punched by the press may be offset from the preceding group by an amount which will vary in accordance with the amount of camber in a length P which is equal to the distance the strip moves between adjacent groups of perforations.

In subsequent coating, shearing and can-end punching operations, it will be necessary, in order for the gauging edge G to remain in contact with a reference gauge such as indicated at H that it be adapted to move sidewise under the ruging of some means such as a spring press roller which engages on its opposite side. It is more economically feasible that the feed sprockets which guide the ribbon stock into these various stations be fixed on their respective shafts, rather than free to slide laterally. Consequently, if the ribbon is to be able to float sidewise to continuously engage H, it will have to float sidewise with respect to the teeth of the feed sprockets as they engage in the perforations. This means that the width W of the perforations must be wider than the thickness of the sprocket teeth by an amount P that will permit the teeth, when in the last perforation of any one group, to enter the first perforation of the succeeding group without the strip itself moving sidewise. In an assumed case, the strip 32 will move forward approximately 13 inches between adjacent series of perforations or, if the camber of the strip is assumed to be one thirty-secondth inch, then the strip must move sidewise one thirty-secondth inch from one punching operation to the next and the width of the perforations W should be at least one thirty-secondth inch greater than the width of the sprocket teeth.

The concept of a feed roll system which will permit the ribbon 32 to float sidewise with its edge against a reference stop while at all times keeping full control of the rate of longitudinal feed of the strip forwardly through the various machines is of fundamental importance to the invention as is also the concept of using a corresponding reference stop in each of the subsequent coating, shearing and blanking machines and providing elongated perforations in the ribbon stock which will permit it to ride the drive sprockets properly and at the same time to float sidewise in order to keep its gauging edge always against the reference stop. It is these two concepts which assure registration of the ribbon stock through the succeeding machines and so that the can-ends as punched from the ribbon will contain the spot coating accurately centered thereon.

Returning now to FIGURE 1, as the perforated ribbon leaves press 44 it travels over roller 130 into a slack loop indicated at 56 from whence it is fed by toothed sprocket 54 beneath coating roller 52 which deposits coating material from well 132 onto the sheet stock as a series of spots indicated by the solid circular lines 34 of FIGURE 2. Centering of these spots on the potential can-end forming blanks 34 is obtained first by reason of the longitudinal indexing of the teeth 55 of the sprocket 54 in perforations 48 and secondly by the lateral movement of the ribbon 32 against a fixed gauge 57 by means of spring-actuated roller 59 engaging on its opposite side. Thereafter, the now spot coated ribbon enters a heating chamber indicated generally at 134 in which the deposited but still wet spots of enamel or other coating material are exposed to a direct flame or to radiant energy in accordance with known conventional technique to cure the same. Conveniently, the ribbon may be drawn through the heating chamber 134 by means of a simple metallic ribbon conveyor 136 of woven metal cloth or any other appropriate means. Such material may be of nonmagnetic character and a magnetic pulley 138 may be associated therewith for driving the tin-plate ribbon through the chamber. Other magnets indicated at 140 may be placed under the conveyor material to further aid in said driving action. The return side of the conveyor belt after it leaves the rear pulley 142 is preferably cooled by passing it through a cooling chamber 144. This is of importance since the conveyor material should arrive at pulley 138 always at the same temperature in order to have constant and uniform heating conditions for the enamel. When running empty, the conveyor material should preferably have the same temperature at pulley 138 as when it is running loaded.

Upon leaving the heating chamber 134, the ribbon immediately enters a cooling chamber indicated at 146. This cooler may also have associated therewith a conveyor belt 148 of similar construction to belt 136 and include a magnetic pulley and additional magnets on the belt. This chamber may be cooled by circulating air therethrough or in any other convenient and appropriate manner. Upon leaving cooler 146, the sheet, now spot coated and suitably perforated, is recoiled on a spindle 150 and stored until ready for punching out of the now-coated blanks 34.

The velocity of the ribbon through the heated cooler should be uniform and continuous in order to assure uniform treatment of the enamel spot coatings applied to the ribbon. For this reason once a ribbon has been started through the heater it cannot be stopped without damage to the ribbon in the heating zone. One purpose of the magnetic pulleys and magnetics on the conveyor belts is therefore to aid in transferring the leading edge of a coil from one device to the other.

The coiled ribbons of spot coated tinplate are next worked into finished can-ends. One way this can be accomplished is by a machinery line such as illustrated by FIGURES 9, 10 and 11. It will, of course, be appreciated that the now to be described punch press equipment for blanking and finishing the ends may be in tandem with the baking and cooling chambers. This, however, will not usually be the case for the reason that the punch press line will have more capacity and feet per minute of ribbon than does the bake oven.

Turning now to FIGURE 9, a coil 150 of spot coated sheet metal as processed by the apparatus of FIGURE 1 is now mounted on a spindle 154 from which it is uncoiled into a slack loop indicated at 156 and fed through a series of tandem arranged punch presses identified as 158A, 158B, 158C respectively. Each of these presses will be provided with a finger bar feed located to engage one row of indexing holes 48 and/or the sides of the spot coated sheet stock 152. Each press is also equipped with two punches, one working ahead of the other and in separate rows as indicated at I and II in FIGURE 12 to simultaneously punch out a pair of can-end blanks 34. Also as indicated in FIGURE 12 behind punch I and aligned laterally with punch II is a shear blade 160 which serves to trim the scrap material 161 from the remainder of the sheet. Said shear blade 160 is so arranged that as it cuts away scrap material 161 for deposit into receptacle 162, it also produces a gauging edge 164 (FIGURE 12) for use by the succeeding press in the line. It will be appreciated that the entire ribbon enters press 158A and its edge 58 is urged against a fixed gauge 159 in appropriate manner, the first two rows of coated blanks being stamped by punches I and II of the press 158A and the scrap cut-away into chopper 162A. The remainder of ribbon comprising four rows of blanks enters a second slack loop 166 from which it is fed into press 158B. Two more rows of can-ends are there blanked out as its gauging edge 164 is held against an appropriately located gauge roll 159'. Scrap material is again cut away and into chopper 162B leaving a further gauging edge 165 on the remainder of the ribbon, which is now but two blanks wide. This remainder then enters slack loop 168 on its way to press 158C, where the remaining two rows of can-end blanks are punched. Since this completes the punching of the can-ends, no shear blade 160 is required by press 158C and the remaining scrap material is simply fed into chopper 162C.

It will be appreciated that each of the presses 158A, 158B, 158C will run in a one to one relationship by means of synchronous motors which will lock-in and run in unison under load. Preferably each of the presses will also be equipped with a clutch between its motor driven fly wheel and its crank shaft and controls for these clutches will be electrically hooked in parallel so that all clutches will engage or disengage simultaneously. Through such an arrangement no press can get very far out of step with any other press. While it is necessary that all the presses make substantially the same number of strokes in any long duration of time, it is not essential that they operate in phase or make exactly the same number of strokes in any given short interval. This is possible because of the slack loops 166 and 168 which are present between each pair of presses and provide sufficient flexibility to the operation that one press is able to start or stop ahead or behind another. Obviously, the length of the slack loops between the presses should be long enough to provide the needed flexibility yet not so long as to be awkward to handle. Furthermore, as indicated in FIGURE 10 presses 158B, 158C are in offset although in tandem relation and preferably have their bed plates steeply inclined as illustrated by FIGURE 11 so that the finished can-ends can slide down to bed plates and into a chute for conveyance by gravity to the machine for performing the next operation thereon. Best results are obtained when the ribbon travels in an essentially straight line. For this reason, the second press in the line preferably will be to the right of the first press and higher while the third press will be to the right of the second and higher than it whereby the ribbon can be moved through a single although inclined plane. It will also be appreciated that the uncoiling spindle 154 will be so supported that it can be loaded while in a horizontal position and then adjusted to an angle matching the inclination of the beds of presses 158A, 158B and 158C.

In an alternate method, the wide ribbon may be first scroll sheared in the direction of its length so as to comprise a number of narrower ribbons as illustrated in FIGURE 13. Each of these narrower ribbons, for example, may comprise two rows of blanks wide. Each of these narrow ribbons would then be fed through separate punch presses, but which presses would operate simultaneously.

Thus referring to FIGURES 13 and 14 and first to FIGURE 14, the coil of spot coated sheet metal 150 obtained from FIGURE 1 will be mounted on a spindle 170 from which it is fed through a slack loop indicated at 172 over a toothed sprocket 174 into a scroll shearing device 176 having pairs of blades 178 and 180 spaced as indicated in FIGURE 13 so as to sever the wide sheet 150 into narrower strands 150A, 150B, and 150C along scroll lines indicated at 182 and 183. To facilitate such shearing action, the ribbon stock 32 will also have been provided with clearance holes 184 as it was passed through press 44 in the apparatus line of FIGURE 1. These clearance openings are also located in the waste areas between the potential can-end forming blanks 34, and provide relief areas into which the corners of the scroll shear blades penetrate during their cutting action. This makes it unnecessary for consecutive cuts by the scroll shears to exactly line up with each other. If the clearance openings were omitted and adjacent cut lines did not exactly match, there would either be short uncut areas between adjacent ribbons or short slivers would be cut therebetween. Either of these conditions would bring on objectionable results. In the scroll shearing device 176, as in the spot coating device, the perforations 48 working in conjunction with the feed sprocket 174 position the ribbon in proper longitudinal relation to the shear blades as the ribbon 150 is shifted sidewise by a spring pressed roller 173 to engage gauge 175 and so obtain lateral alignment of the ribbon in the press.

The three narrower ribbons 150A, 150B, 150C into which this wider sheet is thus divided are then passed into respectively aligned punch presses 158A', 158B', 158C'. In the manufacture of tinplate, conditions will exist that cause the finished ribbons to be sometimes thicker and sometimes thinner than the normal thickness. Also, pin holes may occur in the ribbon. It is desirable that can-ends which are thicker or thinner than a given standard or contain pin holes be separated out from the normal can-ends. This function can be performed by placing inspection devices such as indicated at 180A and 180B immediately ahead of each of the punch presses 158A', 158B' and 158C'. Such inspection devices are well known to the industry and form no part of the present invention. It, however, might be pointed out that inspection device 180A usually takes the form of a light sensitive element which is located on one side of the sheet to be inspected and a light source is positioned on its other side. As the ribbon moves between them, its entire area is scanned. A pin hole in the ribbon will let light through so as to trigger the light sensitive system, which in turn controls other apparatus either to perform certain predetermined functions such as marking the areas of the pin hole. A memory device also may be used which permits a delayed action to an actuating signal to reject an area as it is later cut from the ribbon. The sheet thickness measuring device indicated at 180B conventionally embodies a pair of rollers continuously riding the ribbon and which operate by means of a variable electrical output which is a function of the metal thickness, to control rejecting apparatus as before described. For example, where the ribbon thickness is within tolerances suitable for manufacturing can-ends it will flow through the normal channel. However, if the metal is too thin, the can-ends made from it can be diverted through an undergauged channel, while if the material is too thick, can-ends made therefrom can be diverted through a second channel for over-gauged material.

It will be further appreciated that each of punch presses 158A', 158B', 158C' may comprise a system of machines aligned therewith. For example, a curling machine may be coupled to the punching press which in turn is coupled to a machine which applies lining material. Thus for example, punch press 158A' or its counterparts 158B' and 158C' will punch out can-end blanks and draw the blank to its final shape except for the curl at its extreme outer periphery. Press 158A' will then deliver the thus processed can-end to the curling machine for finishing the periphery of the blank to its final mechanical shape. Thereafter it will pass to the third machine which will apply gasketing material into the annular groove formed by said curling machine. Such a system of machines is well known to the can making industry and for the purposes of this invention can be used in substantially their known form.

Each of narrow ribbons 150A, 150B and 150C will be thus similarly and simultaneously treated and processed into can-ends. Referring to FIGURE 14 narrow ribbon 150A on exiting from scroll shear 176 first passing through inspection devices 180A and 180B from which it forms into a slack loop 179 and proceeds into press 158A. There it is properly aligned as previously described and the blanks severed therefrom. The remaining scrap is collected in cutter 162A. Simultaneously ribbon 150B exiting from scroll shear 176 travels upwardly and over press 158A' along a trough-like support 181, then descending into a slack loop 190 from which it is fed through inspection devices 180A and 180B corresponding to devices 180A and 180B, then into slack loop 192 and through press 158B where the rows of container ends are punched out as in press 158A and the scrap therefrom passed through cutter 162B into collector 186B. In similar fashion narrow ribbon 150C will travel over presses 158A and 158B along an overhead trough 194 and downwardly into a slack loop 196, then through inspection devices 180A and 180B into slack loop 197 and into can-end punching press 158C, scrap therefrom being passed through cutter 162C and collected at 186C.

Convenient manual control devices such as "inching" switches can be provided so that threading the sheet metal ribbons through the system will be quick and easy. During actual operations each press unit will operate at the same rate because of the synchronous motor drives. Automatic jam detection devices can also be provided to stop the machines in the event of trouble. For the purposes of this invention, the safety stops on all machines will be so coupled that if any one machine is stopped, all will stop. A master switch will also be relied upon to start all units simultaneously. However, a reasonable amount of lag between starting and stopping of the different units can be tolerated because of the slack loops.

The arrangement thus far described with relation to FIGURES 13 and 14 require index perforations 48 and clearance openings which are formed as separate elements. However, their junction may be combined into single elements which will permit a scroll shearing effect as illustrated in FIGURE 15. In this instance, press 44 of FIGURE 1 is used to perforate rows of openings 200 in the sheet metal ribbon arranged in a zig-zag pattern as indicated in FIGURE 15. These openings or perforations 200 initially function as indexing perforations to be engaged by the teeth of sprocket 42 and sprocket 174 which immediately precedes and feed the wide ribbon into the coating apparatus 52 and scroll shear 176 respectively. However, in shear press 176, the shearing dies would divide wide ribbon 32 into narrower ribbons 150A', 150B' and 150C' along zig-zag lines communicating with said openings, in which instance the openings 200 would function as clearance or relief areas for the shear blades of press 176. Since perforations 200 would thereafter not be available for further indexing of the narrow ribbons, the succeeding punch presses 158A', 158B' and 158C' would require a modified feed bar mechanism adapted to engaging the sloping edges of the individual strips 150A', 150B' and 150C'. Such a feed bar might comprise two sections, one section which would move laterally as well as reciprocating longitudinally of the ribbon and would constitute the gauging member against which the first section of the feed bar would urge the ribbon to achieve lateral alignment of the ribbon in the press. Longitudinal alignment and thereby proper indexing of the ribbon stock will be achieved by the forward reciprocating movement of the two sections of the feed bar. The sloping edges of the ribbons on one or both sides thereof as the case may be provide generous surfaces which have been accurately located by scroll shear press 176 so that proper registration of spot coated ribbons with the dies of presses 158A', 158B' and 158C' is assured.

The invention thus far has been considered as operating under conditions where the can-ends require a coating on one side thereof. If no coating is to be applied to either side of the can-ends, then of course, the coating apparatus 52 and succeeding heating and cooling chambers indicated at 134 and 144 in FIGURE 1 can be omitted or by-passed and the ribbon of sheet stock directly led from the perforating press 44 to the scroll shear 176 of FIGURE 14 or to the presses 158A, 158B and 158C of the FIGURE 9. Presumably the process would then comprise a single line of apparatus which would perform the steps of first perforating the sheet stock in press 44 to form the index and/or clearance holes and, without being recoiled. It would be then fed into the can-end presses of FIGURE 9, or into the scroll shear press 176 of FIGURE 14 and then into the can-end punching presses of said alternate line, these steps being practiced as previously described.

If more than one coating is to be applied to a single side of the disk, it will be appreciated that the wide ribbon as it exits from the cooling chamber 146 in FIGURE 1, need not be immediately coiled, although this is also possible, but may be immediately fed into a slack loop and thence into a second line of coating, heating and cooling stations to apply the second layer of coating material. Such an arrangement would correspond to elements 52, 134 and 144 as already described. If there is insufficient space or the necessary equipment for the longer line thus needed, after the first layer has been applied and cured the stock can be rolled onto spindle 152 as before described and the collected coil remounted on spindle 30 and passed through the line of FIGURE 1 again. In this instance, however, since the ribbon stock already contains the essential indexing perforations 48, it will be so directed as to by-pass press 44 and fed directly into coater 52.

On the other hand, if the coating is to be applied to both sides of the sheet stock, some further modification of the process will be required. One method would be, of course, to first coat one side, and after baking, simply reverse the stock so that the coating process may be repeated on the reverse side. One difficulty with such a method is that the enamels or other coating materials utilized are often cured at relatively high temperatures and are thermoplastic in nature so that they tend to become tacky when reheated to said high temperatures. Under these conditions, there will be a tendency for the first applied coating to soften during the second processing and, if it is on the bottom side, to stick to the supporting surface such as belt 136 by which it is moved through the heating chamber 134. If the coating of the material applied to the first side of the blanks is of a thermosetting nature, there may be no such problem.

However, FIGURE 16 illustrates how the apparatus line of FIGURE 1 has been suitably modified to accommodate spot coating the sheet stock 32 on both sides of the blanks 34 and suitably curing it before being rolled into coil form about spindle 152. Thus, in FIGURE 16, the ribbon stock 32 is payed off spindle 36 as before and after slack looping at 38 is passed through the perforating press 44 and over roller 130 into a slack loop 56. From said loop, the indexed ribbon 32 is fed into a spot coating device 202 which embodies a pair of rollers 204 and 206 adapted to apply coating materials from wells 208 and 210 simultaneously onto the opposed sides of the blanks in the ribbon 32. As in the embodiment of FIGURE 1, the sheet metal ribbon 32 is indexed by means of a toothed sprocket 212 and a spring pressed roller is provided for engaging one edge of the ribbon and forcing it sidewise toward a fixed gauge on the opposite side. It will be noted that, in this arrangement, the coating station is so arranged that the sheet metal 32 proceeds vertically between the coating rollers 204 and 206 downwardly through a vertical tunnel 214 where a pair of guard rails 216 and 216' loosely restrain it by edge contact so as to prevent it from moving beyond the desired path of travel. As the ribbon proceeds downwardly through the tunnel 214 the spot coatings applied to its two sides pass between suitable thermo devices indicated at 218. Usually three or four seconds will suffice for the heat treatment and therefore the height of the vertical paths need not be excessive. Approximately 20 feet will usually be sufficient. Upon reaching the bottom of the heating chamber, the strip is turned and pulled upwardly through the cooling chamber 220 where it is contacted by cooling air from ducts 222. At the top of the cooling chamber, the ribbon is passed over an idle roller 224 and recoiled about spindle 152 until needed for the can punching operation which may utilize the apparatus lines of FIGURE 9 or 14. In apparatus line illustrated by FIGURE 16, it will be recognized, that the ribbon stock may be coated on one side only or on both sides simultaneously.

A vertical oven, however, is not always convenient because of its necessary height. Then too a leader of some sort is required to keep the ribbon from falling after it has passed the feed rollers 212.

FIGURE 18 illustrates an alternative coating process which may be practiced by modifying the perforation forming press 44 of FIGURE 1 so that in addition to forming index perforations 48, a press 44' is provided which additionally produces projections in the ribbon stock such as the dimples 230 illustrated according to FIGURES 18 and 19, or the tines 232 illustrated according to FIGURES 20, 21 and 22. For reasons which will be hereinafter made clear, press 44' is not adapted to punch clearance holes 184 as does press 44 under certain circumstances. Referring particularly to FIGURE 18, a coil 30 of relatively wide tinplate 32 is, as in the method according to FIGURE 1, payed off a power driven continuously rotating spindle 36 into a slack loop 38 and fed therefrom between feed rollers 40 and 42 into press 44'. As previously described feed rollers 40, 42 are so constructed to permit the ribbon 32 to float sidewise with its edge against a reference stop within the press 44' while fed forwardly through the press at a velocity controlled in accordance with the reciprocal stroking of said press.

Although press 44' is generally similar to press 44 of FIGURE 1 in its operation, it does differ therefrom in that its dies have been suitably modified to permit punching index perforations 48 and also to impress tines 232 as in the modified ribbon of FIGURES 20-22 or dimples 230 as in the modification according to FIGURES 18 and 19. Preferably, as in the use of press 44 the index perforations 48 are located in the waste areas between each pair of rows of potential can-end forming blanks 34. Thus, if the ribbon is six can-end forming blanks wide, preferably three of rows of index perforations will be produced. However, as indicated in FIGURE 19, under some circumstances, it may be more convenient to provide only two rows of index forming perforations and to locate these along the outside edges of the ribbon of sheet stock as at 48'. The lugs or tines 232 of FIGURE 20 or the dimples of FIGURE 18 are also located in the waste areas and are spaced about the can-end forming blanks 34 in a regular pattern. Certain of the tines or dimples are impressed upward while others are impressed downwardly as will be apparent from a comparison of FIGURES 21 and 22 with FIGURE 20 and FIGURE 19 with FIGURE 18. In FIGURE 20, those tines impressed upwardly are indicated by the semi-circular arcs pointed toward the top of the sheet while those impressed downwardly are indicated by the semicircular arcs pointing downwardly. In FIGURE 18 the dimples are represented by V marks. Those projecting upwardly from the sheet metal have their apex pointing toward the top of the drawing while those dimples projecting downwardly are represented by the V marks having their apex pointing toward the bottom of the drawing. It will be appreciated that the tines and dimples may be any desired shape and in fact, may be replaced by other suitably formed projections.

The purpose of the tine or dimples is to provide supporting areas about the can-end forming blanks 34 which will cooperate with the guard rails, pulleys and/or belts in the subsequent curing ovens and other machinery through which the ribbon is passed to retain the critical wet enamel areas in spaced relation and out of contact therewith. It will be appreciated that the tines should not only be deep enough but also spaced close enough together that the strip may move along the guides and bend around pulleys without critical areas sagging enough to contact the guides or other supporting surfaces.

Thus in FIGURES 19 and 20, it will be noted that each potential end-forming blank 34 is surrounded by six dimples, three of which are convexed upward and three of which are convexed downward. In most instances, it has been found sufficient that the dimples or tines be about three-sixteenths inch deep.

From the punch press 44' the perforated ribbon now provided with spaced dimples, tines or other projections passes over idler 130 into a slack loop 56 from which it is fed by a feed roller 54 between a pair of spot coating rollers 52 and 52' which are adapted to apply concentrically arranged spots of coating onto the ribbon stock passing therebetween as in the embodiment according to FIGURE 16. If desired, coating rollers 52 and 52' may be provided with relief areas into which the tines or dimples may project in order that the rollers may more readily deposit their spots of coating lacquer onto the two sides of the potential can-end forming blanks 34 of the ribbon. The bake oven into which the ribbon proceeds from the coating station may be of a construction similar to 134 of FIGURE 1. It may, however, be further equipped with an overhead belt 234 which bears down lightly on the upstanding tines 232 or dimples 230 of the now wet coated ribbon to aid in driving the strip through the heating chamber 134. The ribbon as it leaves the heat treating chamber next passes into a cooling chamber 146 as in FIGURE 1, but which may also be provided with an auxiliary driving belt 236.

Upon exiting from the cooler the temperature of the coated ribbon is such that it may again be coated and baked, if that is necessary. In this event the sheet stock will pass into a slack loop and be fed back into and between a pair of coating rollers such as 52 and 52' to repeat the coating and curing cycle. In order to allow the operator sufficient time in which to feed the leading edge of the ribbon into the second coating machine, it may be necessary to provide a pit into which a slack loop of the ribbon may temporarily form as it exits from the cooling chamber. Through this expedient it will not be necessary to stop the movement of the ribbon through the first curing chamber.

The ribbon now coated on both sides of its can-end forming blanks is ready to be recoiled for later use. It also has dimples 230 or tines 232 projecting from its top and bottom surfaces. Recoiling the strip with these tines or dimples present would be highly unsatisfactory since each turn of the sheet metal around the coil would require perhaps 20 times the volume of a turn of original undimpled strip. Also the dimples or tines would tend to create local pressure spots on the adjacent surfaces of the coiled stock with which they came in contact. Therefore, after the desired number of coats have been applied to the two sides of the sheet metal and before it is ready to be recoiled, the ribbon of sheet metal is passed through a second press which is of a construction generally similar to press 44' but having its dies arranged so as to punch out circular areas containing the dimples or tines. Such a press is illustrated at 238. Preceding it is a tooth feed roller 240 which engages in the index perforations 48 or 48', as the case may be. The sheet stock is also simultaneously urged sidewise into edge contact with a fixed gauge as in the coating steps previously described so as to bring the dimples or tines into registration with the dies of press 238. The dimples are removed by punching out a circular area slightly larger in diameter than the base of the dimples or tines.

Referring back to FIGURES 19 and 21, it will be noted that the tines and/or dimples have been arranged in a pattern such that the holes punched in the strip to remove the dimples are now located that they may serve as clearance holes for the ends of the cutting tools of a longitudinal scroll shear such as 176 in FIGURE 14. It will, of course, be understood that if desired, the sheet stock may also be processed in the manner and using the apparatus described in connection with FIGURE 9.

In such a punch press operation, it will be appreciated that the punches will tend to produce burrs around the holes as they break through the material of the sheet metal ribbon. It is important in the manufacture of metal containers that at least the enamel or other coating material on the inside of the can not be scratched. This means that it is important in practice to so arrange the dies in the dimple or tine removing press 238 as well as the index perforation forming presses 44 and 44' that the sharp edges of the burr will be thrown to the side of the ribbon on which is placed the enamel most important to be protected from scratches. In recoiling the coated ribbon, the burr will therefore contact the opposite side of the ribbon and removes the possibility of accidental damage by the burrs to the more critical enamel areas. Upon leaving press 238, the ribbon is then recoiled on a suitable spindle 150 as in the embodiment of FIGURE 1 and the ribbon is ready to be processed into container ends by the apparatus illustrated in FIGURES 9, 10 and 11 or 14.

It will be understood further that press 238 might also be provided with scroll shearing blades which cut the strip into narrower ribbons corresponding to 150A, 150B and 150C of FIGURE 13 and that these are recoiled on separate spindles to provide three coils of narrower ribbons each of which can be then worked into finished can-ends by a single press punch unit such as illustrated in FIGURE 14. In effect this would be adding the shearing function of press 176 into the dimples removing press 238. Advantages of such a modification would be the handling of narrower size coils of coated metal which would also be lighter in weight. Also it would permit the elimination of overhead troughs such as are used in the apparatus line of FIGURE 14 and the necessary synchronization of a plurality of presses simultaneously operating on a single ribbon.

Instead of the continuous belt type oven and cooling chamber illustrated in the embodiment according to FIGURE 18 an oven such as illustrated at 240 in FIGURE 24 might be used. Referring to FIGURE 24, it will be seen that oven 240 comprises an outer shell 242 of suitably insulative material and is divided into an upper section 244 and a lower cooling section 246 by means 248. Inside shell 242 are vertically stacked a number of horizontal moving conveyor belts 250, every other one of which moves in the opposite direction. These conveyor belts may be made of closely woven metal cloth and carried between them a pair of chains passing around appropriate sprockets 252 and joined by suitable cross pieces which extend beneath the metal cloth to prevent its sagging. The chains of the several belts are driven from a common drive at the same velocity. Input to the oven is along an inclined belt 254 which levels off at 256 to form the uppermost pass in the stack. Input belt 254 will also be made of metal cloth and similarly supported between a pair of drive chains. These chains are, however, provided with a plurality of spaced lugs 258 over which a metal threading bar 260 may be hooked. Such a threading bar 260 will be sufficiently longer than the ribbon is wide to span the distance between the two side chains of the conveyor belts and is adapted to be quickly fastened to the leading end of ribbon 32 as it comes from the coating rollers. Preferably the belts will exceed the width of the ribbon so that the ribbon as it is pulled by the threading bar 260 along with the belts will be out of contact with the chain drives on their two sides. The dimples or tines in the stock will maintain its wet coated areas out of contact with the belts. In practice, the leading end of the ribbon is thus led up the inclined chains of conveyor 254 and along its horizontal path to its extreme end. Under the influence of the heavy weight of said threading bar 260 the strip will bend around the pulley at the end of the horizontal pass of said conveyor belt 254 and the bar will move downwardly until it rests on the oppositely moving conveyor belt next below. As the weight of the bar transfers to the lower conveyor, it will start to move therewith. Since the bar must be accelerated by frictional engagement with the conveyor belt, it will not immediately assume the conveyor velocity. This, however, is a favorable reaction since it tends to produce a certain amount of slack between the conveyor contour around the pulley and ribbon 32. The leading end of ribbon 32 is then carried by bar 260 to the end of this conveyor belt, at which point it is transferred to the next lower conveyor. The sequence of transfers is repeated until the bar finally emerges from the exit point of the sheet at 262. All of the ribbon on the coil will thus eventually pass through the oven as well as the cooling chamber until its trailing end is reached. The fact that there will be a slack at each transfer pulley will give a desirable flexibility between the conveyors and the ribbon.

Once the leading end of the ribbon emerges from the oven at 262, it must be guided into the next machine in the line, namely the tine removing press 238. The oven conveyor belts normally run at 300 ft. per minute or faster, which is too fast for an operator to handle transfer of the leading end of the strip to the feed sprocket of the succeeding press. If the curing characteristics of the coated material will permit, the conveyor belts can be temporarily slowed down to say 20 percent of their normal speed otherwise a pit can be provided at 264 into which a slack loop of the cooled ribbon can form as the leading end is being transferred to the feed sprocket of the tine removing press.

Another arrangement for curing the spot coated ribbon is illustrated in FIGURE 25. In this arrangement the sheet stock is fed off spindle 36 as before and through perforating press 44 by means of feed rollers 40 and 42, then through a single roller coating arrangement as in FIGURE 1 or a dual roller coater arrangement as in FIGURE 18. Thereafter as ribbon 32 leaves the coating roller or rollers, it is forced into an arched form 266 (see FIGURE 26) in which its chord length is substantially less than the arc length. This is accomplished by means of a succession of carrier rollers 270 which are arranged in pairs through the length of the heating and cooling areas of the curing tunnel. At the entrance thereto, the spacing of the rollers in the successive pairs gradually decrease until the ribbon has been suitably arched whereupon the separation of the succeeding pairs of rollers will remain constant in order to maintain the arched effect. At the exit of the cooling chamber the spacing of the rollers in each pair will again increase to allow the sheet to return to its normally flat condition for recoiling and/or further processing. In its travel through the chambers the weight of the ribbon will be supported by flanges 272 of the rollers 270 while its arched form is maintained by the cylindrical surfaces 274 of such rollers. The rollers 270 are preferably power driven at a speed equal to or greater than the velocity of the ribbon 30 through the curing chambers. In its progress through the heating and cooling chambers the ribbon obviously will have no contact with the supporting members except at its uncoated edges.

At the end of the cooling cycle, it may be recoiled and again put through the system as many times as needed to provide the desired number of coats on one or both of its sides.

If it is desired to split the ribbon into a series of narrow strips at the end of the last of the enameling operation, this can be done by feeding the ribbon through a scroll shear press 280 which is of a construction and operates similarly to scroll shear press 176 in FIGURE 18. The thus sheared narrower ribbons will be then coiled onto separate spindles 282, 284 and 286. It is to be understood that the wide ribbon can be coiled about a single spindle 282 and then subsequently processed as by the apparatus of FIGURE 14 or FIGURE 9.

Still another arrangement for supporting the coated ribbon through the curing station is illustrated by FIGURES 27, 28. In this arrangement neither tines, dimples nor other projections need to be impressed in the ribbon stock. However, it may be necessary to increase the number of rows of index perforations so as to provide perforations between each row of can-end forming blanks. In this arrangement, as the coated ribbon exits from the spot coating rollers 52 and 52', it is carried through the heating and cooling chambers by means of lugs 290, which are mounted at spaced intervals along parallel horizontally moving chains 292. These chains 292 are spaced apart a distance equal to the separation of the parallel rows of index perforations 48 in the ribbon stock. Lugs 290 are suitably spaced along the length of the chains to correspond with the spacing of the perforations 48 in each row and have sharpened ends 296 which engage within the perforations 48 of the ribbon stock, the ribbon being supported by the shoulders 298 of said lugs. It will be appreciated that the diameter of said shoulders 298 must be sized to avoid contact with the wet enamel areas. One advantage of this arrangement is, of course, that it eliminates the necessity for first producing tines or dimples and then removing them.

Many other possible variations in the baking and cooling chambers as well as steps in the disclosed methods of driving or feeding the wet coated ribbon stock through the various apparatus may be utilized. However, the previously described means and methods are to be preferred. It will also be understood that, in accordance with the curing characteristics of the particular coating material being applied, the rate at which the ribbon stock is passed through the heating and cooling chambers may or may not coincide exactly with the rate which the stock is perforated and/or sheared. This may be compensated, at least in part, by the provision of slack loops ahead of the coating rollers and at the exit from the cooling chamber.

Although the invention as thus far described is believed to be clear from the detailed description above, there may be some advantage in briefly reviewing the basic operations involved. Can-ends or other container ends, disks or the like are conveniently formed from coiled relatively wide sheet stock by initially uncoiling it on a power driven spindle 31 and first passing it through a perforating machine such as press 44 or 44', to produce index perforations at regular intervals in the ribbon stock which serve to key all future operations on the ribbon to its potential can-end producing areas. The ribbon is also free to float sidewise against a fixed gauge. Thus, it may be considered that the index perforations serve to register the sheet stock in a longitudinal direction and the sidewise movement of the ribbon against the side gauge to register the ribbon stock in a transverse or sidewise direction. This assures that the spot coating and shearing as well as punching out operations by which the ribbon stock is processed into coated can-ends will be in exact register. The perforating tools are preferably so arranged that any burr around the index holes will be on the side of the strip that will avoid its contacting the side on which is coated and most critical enamel, namely the enamel on the inside of the can. Where necessary or desirable, clearance openings will also be punched in the ribbon by presses 44 and 44', to permit shearing of the wide coated ribbon into narrower ribbons which can be more conveniently handled in the can-end punching presses. The clearance opening and index perforations may be combined if that is desired. After being thus suitably indexed, the ribbon is then fed between coater rolls 52 and 52' where spot coatings are applied to one or both sides of the ribbon. The spot coated ribbon is then fed through suitable heat treating and cooling devices such as indicated at 134 and 146 to cure the enamel or other coating material applied. After which the coated ribbon is usually recoiled for future processing into can-ends although the ribbon may be immediately processed into can-ends, if that is desired. In forming the ribbon of spot coated sheet metal into can-ends, the reels of coated ribbon are uncoiled and fed between the dies of suitable presses 158 which punch out the can-ends, the dies of these presses being in proper registration with the coated blanks by the means aforementioned.

In the can-end punching operation the sheet stock may be first scroll sheared by means 176 into narrower ribbons or the wide sheet stock may be immediately passed through a series of tandem arranged small presses 158, each of which is adapted to punch out two or more rows of can-ends while shearing the waste stock therefrom and simultaneously providing a second gauging edge for controlled feeding of the now reduced ribbon through the next press. In either arrangement, it is contemplated that the punched out can-ends may be immediately passed to adjacent machinery where their edges are curled to produce a groove which is lined with appropriate lining material. Thus completed, the can-ends are passed for assembly with cylindrically rolled sidewall blanks into cans. Waste material is passed through scrap choppers for convenient disposable.

Thus far the invention has been described in its application to manufacture of the can-ends. However, it is contemplated that the sidewalls of the cans will also be formed from coiled sheet stock and in FIGURES 29 and 30 suitable apparatus is illustrated wherein a ribbon 300 of sheet metal is fed from a power driven reel 302 into a slack loop 303 from whence it is fed by rollers 314, 316 into a flying shear press 308 having reciprocating shears 304, 306, which cut the ribbon 300 into a number of smaller sheets 309. 318, 320 represent take away rollers that extract the cut-to-size pieces 309 as they are sheared from ribbon 300 and deliver them to a gang type body blank slitter 310 where they are cut into a number of rectangular pieces as indicated by A, B, C. From this first slitter 310 these rectangular pieces are delivered directly to the table of a second gang slitter 311 arranged at right angles to the first slitter. In this second slitter, each of the rectangular pieces A, B, C are cut into smaller rectangles A', A$^2$, B', B$^2$, C', C$^2$. Each of these smaller rectangles comprise a body blank which is then rolled into cylindrical forms by apparatus indicated at 312 to produce the blanks 313 having their longitudinal meeting edges soldered at 313A and are ready for assembly with the can-end blanks which have been produced as previously described.

To divide the ribbon 300 into the rectangles 309, a flying shear type of press is utilized which may be of a construction such as described with reference to FIGURES 4 and 5 and indicated broadly at 44, assuming of course, that the perforating punch dies thereof described as mounted on platens 60 and 62 are replaced by shearing elements 304, 306. In order that the sheets 309 be accurately cut to their required length from the uncoiling ribbon stock 300, it is again essential that a free floating feed roll system be employed which will allow the stock to move sidewise with reference to a side gauge as it is fed forwardly between shearing elements 304 and 306—so as to compensate for the cambered side edges of the stock 300 which takes on a warped character as it is unrolled from reel 302 into slack loop 303. Such a feed roll system is illustrated by rolls 314, 316 which correspond to feed rolls 40, 42 in FIGURE 1.

Although press 44 modified as indicated above might be utilized, I have found that a short stroke press is to be preferred even though the r.p.m. of the crank and centrifugal forces must be proportionately greater. Thus, it will be appreciated that to shear continuously moving strip 300 into pieces 309 of accurate length, the shear blades, at the intsant of shearing, must be moving with the strip and at the same velocity. Consequently, the circumferential speed of the shear blades must be the same as the linear velocity of the strip as it is driven through the press, i.e. length of the circular path traveled by the shear blades for each stroke of the press must be the same as the length of the sheet that is to be sheared. For example, if ribbon 300 is to be cut up into rectangular pieces 309, each 40 inches long, then the crank circle will have a circumference of 40 inches or a diameter of 12.7 inches. However, such large crank diameters make for large and ponderous machines which break down rapidly in service.

Referring to FIGURES 29, 31 and 32, I have illustrated how a flying shear press of the aforedescribed type (FIGURES 4 and 5) may be modified to reduce the diameter of the crank circle when utilized for shearing the coil stock into can wall blanks. In this modified construction, the shear blades 304, 306 are attached to cranks having a much smaller radius for example, only ⅓ as great and are provided with means so that instead of cutting at each revolution of the cranks, one of the shears blades is retracted to an inoperative position for two consecutive revolutions and is restored to shearing position for at least a part of the third revolution. The blades therefore shear the ribbon only once in each three turns of the crank. An arrangement of cam and crank lengths could, however, be arranged for any other fraction.

In FIGURE 29, 322 and 324 represent a pair of platens supported by eccentric sheaves 326 and 328 which platens move vertically with respect to each other under the guidance of leader pins 330. Sheaves 326 and 328 are supported on cranks shafts 332 and 334 which are geared to rotate in opposite directions but at equal angular velocity so that shear blades 304, 306 carried thereby follow a circular crank path having a radius and circumference governed by the eccentricity of said sheaves and crank shafts. The system is suitably geared as in the press illustrated at 44 so that the two platens 322, 324 are on inside dead center at the same instant and at which instant move along the feed line of ribbon 300 therebetween. In a similar fashion, feed rollers 314, 316 are geared to the gear system of press 308 as are rollers 40, 42 of press 44 so that they propel ribbon 300 through press 308 at a constant speed and so that the shear blades carried by platens 322, 324 move with the ribbon at the same velocity during their movement of contact with the ribbon. Rollers 314, 316 are of a construction identical to roller 40, 42 and are simply geared to move with the operation of the platen of the press. Reference may be had to FIGURES 6, 7 and 8 and the description which accompanies the same for details of their construction.

Referring now to FIGURE 31, blade 304 is non-retractably mounted on platen 322 while blade 306 is mounted on a slide 336 which in turn is mounted on platen 324 so that it may be retracted into an inoperative shearing position in two of each three revolutions of crank shaft 334. For this purpose slider 336 is spring loaded downward against a cam 338 by means of springs 340 and 342. Cam 338 is rotated by means of sprocket 344, chain 346 double sprocket 348, chain 350, small gear 352, larger gear 354 and smaller gear 356 mounted on the lower crank shaft 334. Rigid links 358 and 360 support the chain drive system thus described and permit it to oscillate about a fixed shaft center 362 on which gears 352 and 354 turn. In the illustrated instance, the gear ratio between gears 354 and 356 is three to one so that cam 338 causes the shear blades to cut the ribbon only once in every three revolutions of the cranks. In the shearing act, the blades overlap each other only a very small amount, if at all, and therefore retractable blade 304 need be retracted only a little more than the thickness of the sheet stock 300 to make the blades inoperative.

Springs 340, 342 keep the blades retracted while cam 338 in its rotation, restores the blade to its shearing position when cutting is desired.

From the aforesaid description it is apparent that all of the previously described objects and advantages as well as features of the invention have been demonstrated as obtainable in a simple, convenient and highly practicable manner.

Now having described my invention, I claim:

1. Method of manufacturing container ends from coiled stock comprising the steps of uncoiling the stock, maintaining one edge of the stock in contact with a reference guide while forming a predetermined pattern of index holes in what will be waste areas of the stock between the container ends to be stamped therefrom, spot coating only the areas of said stock which comprise the container ends to be stamped therefrom, and, after baking and cooling the spot coated stock, stamping out the container ends, and using said pattern of index holes to longitudinally align the stock in said spot coating and stamping steps while urging the stock sidewise against further reference to guides to laterally align the stock whereby the container ends stamper from the sheet stock will contain the spot coatings properly centered thereon.

2. In the process of forming container ends from coiled sheet stock containing longitudinal rows of potential container end forming blanks with waste areas therebetween, the steps which comprise uncoiling the sheet stock into a slack loop wherein the sides of the sheet stock are cambered, feeding the cambered sheet stock from said slack-loop into a first station where regular intervals of longitudinal rows of regularly spaced laterally elongated perforations are successively punched in the sheet stock, causing the sheet stock to float sidewise against a reference stop as it is fed from the slack loop into the first station so that the punched perforations are located in the waste areas between the rows of potential can-end forming blanks, thereafter feeding said perforation-containing sheet stock into further stations while relying on the forward edge of the perforations to obtain longitudinal registration of the sheet stock in said station, and causing sidewise float of the sheet stock against a reference stop to obtain lateral registration thereof in said stations, in one station spot coating only the potential can-end forming blanks, and in another station shearing the coated blanks from the sheet stock.

3. In the process of producing articles from cambered sheet stock in which the potential blanks therefore are arranged in longitudinal rows with waste areas therebetween, the steps which comprise feeding the cambered sheet stock into a first station where a pattern of regularly spaced punchings are to be produced in the sheet stock, causing the sheet stock to float sidewise against a reference stop as it is fed into the first station, and while thus aligned in said station, producing the punchings in the waste areas between the rows of potential blanks, thereafter passing the punched sheet stock through successive stations where coating material is applied to the blanks, the applied coating material is cured and the coated blanks are separated from the waste areas of the sheet stock and in each said stations relying upon certain of the punchings to advance the sheet stock into said stations to obtain longitudinal registration of the blanks while simultaneously urging the sheet stock sidewise to obtain lateral registration of the blanks, and in the curing station utilizing other of said punchings to support the coated sheet stock as it is passed through the curing station.

4. In the process of producing articles from cambered sheet stock in which the potential blanks for said articles are arranged in longitudinal rows with waste areas therebetween, the steps which comprise feeding the sheet stock into a press by engaging the sheet stock on its two sides and applying forces which move the stock lengthwise and simultaneously alternately applying forces sidewise against limit means as it enters said press, and operating the press in timed sequence with the lengthwise movement of the stock to produce a continuous pattern of punching in the waste areas of the stock and about the potential blanks as the stock is fed through the press.

5. In the process of producing articles from cambered sheet stock in which the potential blanks for said articles are arranged in longitudinal rows with waste areas therebetween, the steps which comprise feeding the sheet stock into a press by applying forces to its two sides one of which moves the stock lengthwise into a first station and simultaneously alternately applying forces which move the stock sidewise as it enters said press, operating the press in timed sequence with the lengthwise movement of the stock to produce a continuous pattern of perforations in the waste areas between the potential blanks of the stock as it is fed through the press, and thereafter feeding said stock into a second station where coating spots are to be applied to each of said blanks and longitudinally aligning said blanks with a coating applicator in said second station by means engaging in said perforations and while holding one side of the stock against a reference so that the coating spots will be properly located on the blanks.

6. In the process of producing articles from cambered sheet stock in which the potential blanks for said articles are arranged in longitudinal rows with waste areas therebetween, the steps which comprise feeding the sheet stock into a press by engaging the sheet stock on its two sides and applying forces which move the stock lengthwise into the press and simultaneously alternately applying forces which move the stock sidewise as it enters said press, and operating said press in timed sequence with the lengthwise movement of the stock to produce a continuous pattern of perforations in the waste areas between the potential blanks of the stock as it is fed through the press, thereafter feeding said stock into a station where coating spots are to be applied to each of said blanks, aligning said blanks within said station by means engaging in said perforations as one side of the stock is held against a reference so that the coating spots will be properly located on the blanks, and thereafter passing the sheet stock through a curing station and subsequently rolling it into coils.

7. In the process of producing articles from cambered sheet stock in which the potential blanks for said articles are arranged in longitudinal rows with waste areas therebetween, the steps which comprise feeding the sheet stock into a press by repetitively engaging the sheet stock on its two sides and applying forces which move the stock lengthwise into a punch press and simultaneously alternately applying forces which move the stock sidewise as it enters said press against reference means which limit said sidewise movement, operating said press in timed sequence with the lengthwise movement of the stock into said press to produce a continuous pattern of perforations and projections in the waste areas between the potential blanks of the stock related to one edge thereof as it is fed through the press, feeding said stock into a station where coating spots are to be applied to each of said blanks, aligning said blanks within said station by means engaging in the perforations while moving the stock sidewise against a reference so that the coating spots will be properly located on the blanks, then supporting the wet coated stock by means of said projections while passing the sheet stock through a curing station, thereafter punching out the projections, and rolling the stock into coiled form.

8. In the process of producing articles from cambered sheet stock in which the potential blanks for said articles are arranged in longitudinal rows with waste areas therebetween, the steps which comprise feeding the stock into a press by repetitively engaging the sheet stock on its two sides and applying forces which move the stock lengthwise into the press and simultaneously alternately applying forces which move the stock sidewise as it enters said press, said press having means for limiting said sidewise movement of the stock, operating the press in timed sequence with the lengthwise movement of the stock to produce a continuous pattern of projections and perforations in the waste areas between the potential blanks of the stock related to one edge thereof as it is fed through the press, then feeding said stock into a station where coating spots are to be applied to each of said blanks, longitudinally aligning the blanks of said sheet in said station by means engaging in the perforations and while holding said one edge of the stock against a reference so that the coating spots will be properly located on the blanks thereof, then supporting the wet coated stock by said projections while passing it through a curing station, and thereafter shearing the coated blanks from the stock.

9. In the process of producing articles from cambered sheet stock in which the potential blanks for said articles are arranged in longitudinal rows with waste areas therebetween, the steps which comprise feeding the stock through a press by repetitively engaging the sheet stock on its two sides and applying forces which move the stock lengthwise into the press and simultaneously alternately applying forces which move the stock sidewise as it enters said press, said press having means for limiting said sidewise movement of the stock, and operating the press in timed sequence with the lengthwise movement of the stock to produce a continuous pattern of oppositely extending projections and perforations in the waste areas between the potential blanks of the stock related to one edge thereof as it is fed through the press, then feeding said stock into a station where coating spots are to be applied to each of said blanks, longitudinally aligning the blanks of said sheet in said station by means engaging in the perforations and while holding said one edge of the stock against a reference, and while thus aligned applying coating spots to the two sides of the blanks, then supporting the wet coated stock by said projections while baking and thereafter cooling the spot coated stock.

10. In the process of producing articles from cambered sheet stock in which the potential blanks for said articles are arranged in longitudinal rows with waste areas therebetween, the steps which comprise feeding the sheet stock through the press by repetitively engaging the sheet stock on its two sides and applying forces which move the stock lengthwise into a punch press and simultaneously alternately applying forces which move the stock sidewise so that one edge engages a provided reference as it enters said press, and operating the press in timed sequence with the lengthwise movement of the stock to produce a continuous pattern of perforations in the waste areas between the potential blanks of the stock related to said one edge, then feeding said stock into a station where coating spots are to be applied to each of said blanks, longitudinally aligning the blanks of said sheet in said station by means engaging in the perforations and while holding said one edge of the stock against a reference so that the coating spots will be properly located on the blanks thereof, transversely arching the wet coated stock and passing it through heating and cooling chambers to cure the applied coatings and ready the stock for shearing of the coated blanks therefrom.

11. In manufacturing container ends from sheet stock, the steps which comprise forming a predetermined pattern of projections in the waste portions of the sheet stock between and about the areas from which the container ends are to be stamped, spot coating said areas on both sides of the stock, and supporting the wet spot coated stock by means of said projections while passing it through heating and cooling stations to effect curing of said spot coated areas.

12. In manufacturing container ends from coiled stock, the steps which comprise uncoiling the stock, relating one edge thereof to a guide, and when so related forming a predetermined pattern of index holes and oppositely directed projections in the waste portions of the stock between and about the areas from which the container ends are to be stamped, spot coating said areas on both sides of the stock as the stock is guided by means of said index holes, then while the stock is supported by said projections, passing it through heating and cooling stations to effect curing of said spot coated areas, thereafter cutting out the portions of the stock containing said projections and tightly coiling the spot-coated stock ready for stamping container ends therefrom.

13. In manufacturing container ends from sheet stock, the steps which comprise relating one edge of the sheet stock to a guide, and when so related forming a predetermined pattern of index holes and projections in the waste portions of the stock between and about the areas from which the container ends are to be stamped, spot coating said areas on both sides of the stock as the stock is guided by means of the index holes, then supporting the stock by means of said projections and passing the thus supported stock through heating and cooling stations to effect curing of said spot coated areas, and thereafter realigning the sheet stock by means of said index holes and shearing the coated blanks from the sheet stock.

14. In manufacturing container ends from sheet stock, the steps which comprise relating one edge of the sheet stock to a reference, forming a predetermined pattern of index holes and projections related to said reference to lie in the waste portions of the sheet stock between and about the areas from which the container ends are to be stamped, spot coating said areas on both sides of the stock as the stock is guided by means of said index holes and its said one edge related to a further reference, supporting the wet spot coated stock by means of said projections while passing it through heating and cooling stations to effect curing of said spot coated areas, thereafter removing said projections, and rolling the sheet stock into tightly coiled form.

15. In manufacturing container ends from sheet stock, the steps which comprise relating to one edge of the sheet stock to a reference, forming a predetermined pattern of index holes and projections related to said reference to lie in the waste portions of the sheet stock between and about the areas from which the container ends are to be stamped, spot coating said areas on both sides of the stock as the stock is guided by means of said index holes and with its said one edge related to a reference, supporting the wet spot coated stock by means of said projections while passing it through heating and cooling stations to effect curing of said spot coated areas, and thereafter longitudinally aligning said sheet stock by means of the index holes while relating its said one edge to a similarly located reference and shearing the cured spot coated areas from the thus aligned sheet stock.

16. In a process of manufacturing container ends from coil stock, the steps which comprise continuously relating one edge of the stock to a fixed guide as the stock is uncoiled while simultaneously producing a predetermined pattern of index holes in said stock other than in the areas which comprise the container ends to be stamped therefrom, then coating spots within said areas which are to constitute container ends, and, after curing the coated spots, cutting out said areas in the form of container ends including the coated spots, the stock being caused to slack loop immediately prior to said index hole producing, coating and cutting steps, and in each steps the said one edge of the sheet stock being held against a fixed guide and said index holes being used to obtain proper registration between the coated spots and the areas which are cut out to form coated container ends.

17. In a process of manufacturing container ends from coil stock, the steps which comprise continuously uncoiling the sheet stock into a slack loop, feeding the stock from said slack loop while relating one edge of the stock to a fixed guide and producing a predetermined pattern of index holes in said stock other than in the areas which comprise the container ends to be stamped therefrom, thereafter coating said areas only, and, after curing said coated areas cutting out said coated areas into the form of container ends, the stock being allowed to slack loop between each said steps, and while holding said one edge of the sheet stock against a fixed guide utilizing said index holes to obtain proper registration between the coated spots and the areas which are cut out to form coated container ends.

18. Method of manufacturing articles from coiled stock comprising the steps of uncoiling the stock into a slack loop, longitudinally feeding the stock from said slack loop while holding one edge against a fixed guide, forming index holes in longitudinal rows through said stock related to said one edge so as to lie in what will be waste areas thereof between the blanks for said articles to be stamped therefrom, using said pattern of index holes as a guide to spot coat the areas of said stock from which the blanks are to be stamped while holding the said one edge of the sheet stock against a fixed guide, and, after baking and cooling the spot coated stock, shearing the stock lengthwise along lines joining the index holes in each row, said lines lying in the waste areas between said blanks, so as to divide the coiled stock into narrower ribbons, and thereafter shearing the blanks from said narrower ribbons.

19. In a process of manufacturing container ends from coil stock, the steps which comprise continuously relating one edge of the stock to a fixed guide as the stock is uncoiled and simultaneously producing a predetermined pattern of index holes in said stock other than in the areas which comprise the container ends to be stamped therefrom, said holes defining spaced rows extending lengthwise of the stock, coating spots within said areas while utilizing said index holes to obtain proper registration between the coated spots and the areas which are to be cut out to form coated container ends, thereafter shearing the spot coated stock into narrow ribbons by interconnecting the index holes of each row, said shearing being confined to waste areas of the stock, and stamping out the coated areas from each of the narrower ribbons.

20. In a process of manufacturing container ends from coil stock, the steps which comprise continuously relating one edge of the stock to a fixed guide as the stock is uncoiled and simultaneously producing a predetermined pattern of index holes in said stock other than in the areas which comprise the container ends to be stamped therefrom, said holes defining spaced rows extending lengthwise of the stock, coating spots within said areas while holding said one edge of the stock against a fixed guide and utilizing said index holes to obtain proper registration between the coated spots and the areas which are to be cut out to form coated container ends, thereafter scroll shearing the spot coated stock into narrow ribbons by interconnecting the index holes of adjacent rows, said shearing being confined to waste areas of the stock and while said one edge of the stock is related to a fixed guide, thereafter aligning said ribbons by means of their opposed sides and cutting the coated areas therefrom.

21. In combination, means for forming a predetermined pattern of projections in the waste areas of the sheet stock about blanks to be punched therefrom, means for spot coating said blanks on opposite sides of the stock and means for curing said spot coating prior to the cutting of the blanks from the sheet stock, said curing means comprising a heating chamber and a cooling chamber located in stacked vertical relation, said chambers containing a plurality of continuously moving horizontally disposed conveyor belts, one located beneath the other and every other one moving in the opposite direction, and an inclined conveyor belt for carrying the stock from the coating means to the top conveyor belt of the heating chamber from where it works its way down by means of said conveyor belts to an exit at the lower end of the cooling chamber, means adjacent said lower end for removing the projections from the stock, and a recoiling spindle onto which the stock is coiled.

22. A method of manufacturing can ends from relatively wide coiled sheet stock comprising the steps of uncoiling the sheet stock, perforating it at regular intervals in the waste areas between the locations of the can ends to be cut therefrom, applying coating in the form of a spot within each of said locations and on opposite sides of the sheet stock, and after baking and cooling said spot coated sheet stock, shearing the sheet stock lengthwise into narrow ribbons, then cutting out the coated areas of each narrow ribbon and discharging the waste, the steps of coating, shearing and cutting out of the coating areas being aligned by means of said perforations while relating one edge of the sheet stock to a common reference so that the can ends contain the coating spots properly registered thereon.

23. In a press for performing work on sheet stock as it is fed therethrough comprising a pair of tools mounted on opposite sides of the line of feed of the sheet stock and adapted to move toward and away from said line of feed to work on the sheet stock, a pair of rotatable feed rollers at the entrant side of said line of feed, said rollers having their periphery divided into axial sections, alternate sections being immovable and sections therebetween being axially movable, the two rollers being urged together such that the sheet stock is alternately engaged by the immovable sections of the rollers and then by the axially movable sections, whereby the sheet stock may float sidewise as it is positively advanced forwardly through the press by rotation of said rollers.

24. In a press for performing work on sheet stock as it is fed therethrough comprising a pair of tools mounted on opposite sides of the line of feed of the sheet stock and adapted to move toward and away from said line of feed to work on the sheet stock, a pair of rotatable feed rollers at the entrant side of said line of feed, said rollers having their periphery divided into axial sections, alternate sections being immovable and sections therebetween being axially movable, the two rollers being urged together such that the sheet stock is alternately engaged by the immovable sections of the rollers and then by the axially movable sections, whereby the sheet stock may float sidewise as it is positively advanced forwardly through the press by rotation of said rollers, a reference guide to one side of the line of feed, and means positioned to act on the axially movable sections as they engage the sheet stock therebetween to force the sheet stock sidewise against the reference guide.

25. In a press for performing work on sheet stock as it is fed therethrough comprising a pair of tools mounted on opposite sides of the line of feed of the sheet stock and adapted to move toward and away from said line of feed to work on the sheet stock, a pair of rotatable feed rollers at the entrant side of said line of feed, said rollers having their periphery divided into axial sections, alternate sections being immovable and sections therebetween being axially movable, means urging the two rollers together such that the sheet stock is alternately engaged by the immovable sections of the rollers and then by the axially movable sections, whereby the sheet stock may float sidewise as it is positively advanced forwardly through the press by rotation of said rollers, a reference guide to one side of the line of feed, means positioned to act on the axially movable sections as they engage the sheet stock therebetween to force the sheet stock sidewise against the reference guide and means to recenter the axially movable sections as they are rotated out of their engagement with sheet stock.

26. In a press for performing work on sheet stock as it is fed therethrough, tool means mounted for movement with respect to the line of feed of the sheet stock to perform work thereon, a first feed means which intermittently engage the sheet stock for advancing it longitudinally along said line of feed, a second feed means which engage the sheet stock in the intervals between its engagement by the first feed means, said second feed means urging the sheet stock sidewise when it is engaged thereby, and stop means for limiting the sidewise movement of the sheet stock.

References Cited in the file of this patent

UNITED STATES PATENTS

| | | |
|---|---|---|
| 998,176 | Hodgson | July 18, 1911 |
| 1,799,863 | O'Neil | Apr. 7, 1931 |
| 2,251,295 | Sheesley | Aug. 5, 1941 |
| 2,372,499 | Kerner | Mar. 27, 1945 |
| 2,378,041 | Sebell | June 12, 1945 |
| 2,446,198 | Socke | Aug. 3, 1948 |
| 2,458,538 | Socke | Jan. 11, 1949 |
| 2,480,711 | Calton | Aug. 30, 1949 |
| 2,648,380 | Socke | Aug. 11, 1953 |
| 2,873,803 | Sarka | Feb. 17, 1959 |

OTHER REFERENCES

Making, Shaping and Treating of Steel, 7th edition, 1957, U.S. Steel Corp., pp. 521, 522.